(12) United States Patent
Friedfertig et al.

(10) Patent No.: US 8,738,413 B2
(45) Date of Patent: *May 27, 2014

(54) SEMI-AUTOMATED RECIPROCAL SCHEDULING

(75) Inventors: Marc Friedfertig, Livingston, NJ (US); Alex Kane, Brooklyn, NY (US)

(73) Assignee: 3C Capital, LLC, Livingston, NJ (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/507,403

(22) Filed: Jun. 26, 2012

(65) Prior Publication Data

US 2012/0278119 A1   Nov. 1, 2012

Related U.S. Application Data

(63) Continuation of application No. 12/589,102, filed on Oct. 16, 2009, now Pat. No. 8,239,235.

(51) Int. Cl.
*G06Q 10/00* (2012.01)

(52) U.S. Cl.
USPC ............ 705/7.19; 705/7.14; 705/7.18

(58) Field of Classification Search
USPC .................... 705/7.14, 7.18, 7.19
See application file for complete search history.

(56) References Cited

U.S. PATENT DOCUMENTS

| | | | |
|---|---|---|---|
| 7,282,661 B2 * | 10/2007 | Ulrich et al. | 219/98 |
| 7,430,207 B2 | 9/2008 | Wu et al. | |
| 7,716,078 B2 * | 5/2010 | Bourne et al. | 705/7.18 |
| 7,828,661 B1 | 11/2010 | Fish et al. | |
| 8,301,479 B2 * | 10/2012 | Bourne et al. | 705/7.19 |
| 2002/0059205 A1 * | 5/2002 | Graham et al. | 707/3 |
| 2004/0059617 A1 * | 3/2004 | McGovern | 705/8 |
| 2006/0176807 A1 * | 8/2006 | Wu et al. | 370/229 |
| 2008/0010106 A1 * | 1/2008 | Bourne et al. | 705/8 |
| 2009/0106067 A1 * | 4/2009 | Mann et al. | 705/8 |
| 2011/0191136 A1 * | 8/2011 | Bourne et al. | 705/7.18 |

OTHER PUBLICATIONS

Analyzer Software, League Management Package, Game Scheduler, analyzersoftware.com, retrieved from web.archive.org, Mar. 2, 2008, p. 1-73.*
All Pro League Scheduling Software, Feb. 2009, allprosoftware.com, retrieved from web.archive.org, p. 1-59.*
Matchmaker League and Tournament Scheduler, Jul. 2008, dpsoft.com, p. 1-85.*
Win Sports Software—Reservation/Scheduling Software, http://members.aol.com/win4sports/reserve.html, 2008, p. 1-38.*
Schedule Star, schedulestar.com, 2001, p. 1-64.*
Home or Away Scheduler, Jan. 17, 2008, p. 1-4.*
Analyzer Software, League Analyzer for Hockey, analyzersoftware.com, Jun. 7, 2008, p. 1-2.*
Diamond Scheduler, Feb. 8, 2009, p. 1-2.*
Lawson, The Central Law Journal, vol. X, Jan. to Jun. 1880, p. 451-54.

* cited by examiner

*Primary Examiner* — Justin M Pats
*Assistant Examiner* — Venay Puri
(74) *Attorney, Agent, or Firm* — Frost Brown Todd LLC

(57) ABSTRACT

Schedules which include reciprocal events, such as schedules for youth hockey leagues, can be created using a system in which users can invite one another to schedule games based on information selected through an interface and reciprocal dates which are automatically identified by a suitably programmed computer. Information related to games and schedules can be stored in a database which can be accessed and modified by different users depending on their roles and the permissions associated with those roles.

5 Claims, 23 Drawing Sheets
(13 of 23 Drawing Sheet(s) Filed in Color)

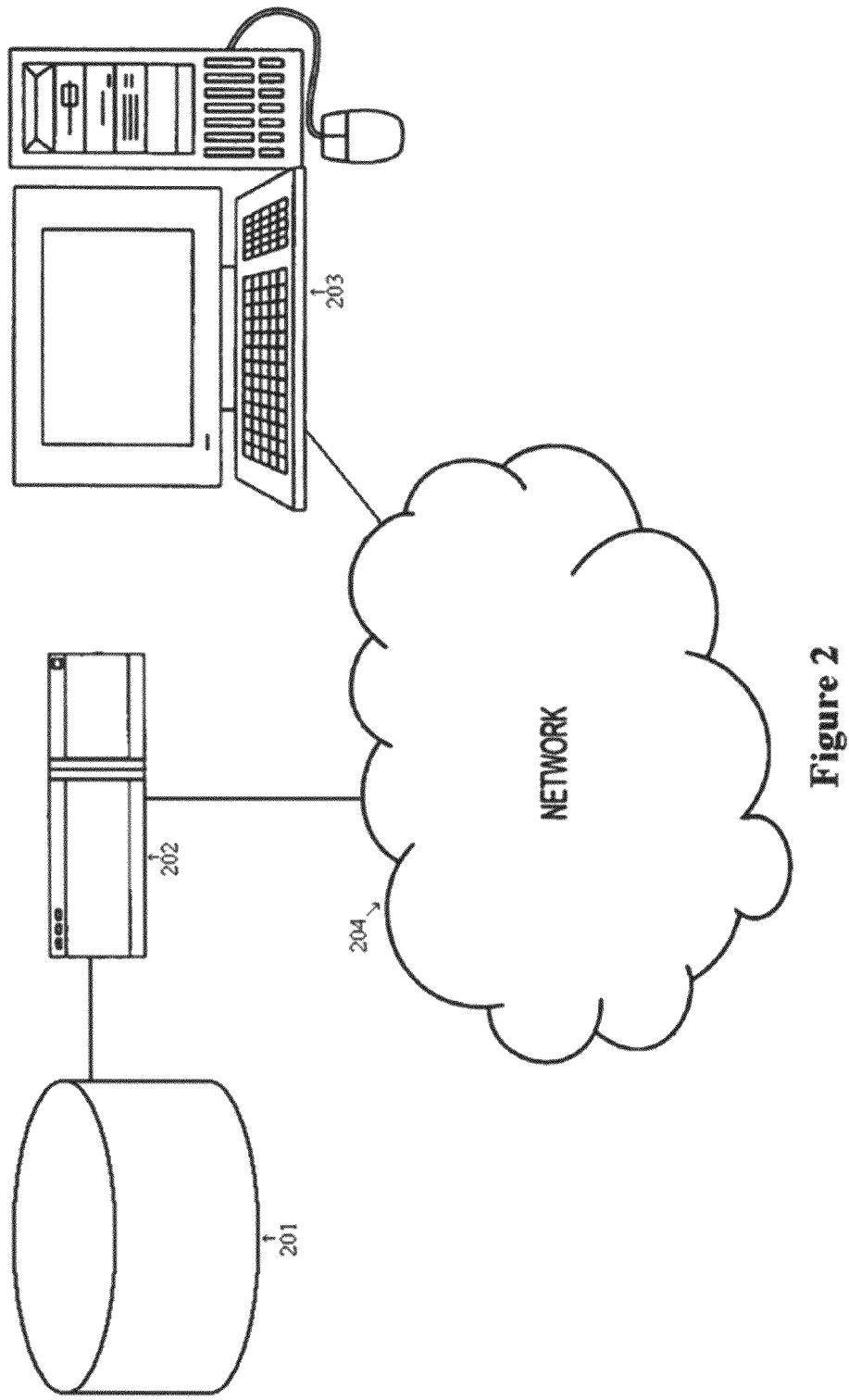

| Date | Time | Status | Type | Home Team | Away Team | Rink |
|---|---|---|---|---|---|---|
| Nov 01 Sun | 12:00AM - 03:00AM | confirmed | Game (L) | NJ Colonials PeeWee A | Freeze PeeWee A | Mennen |
| Nov 07 Sat | 12:00AM - 03:00AM | open | Available home ice date | Open | Open | Aspen Ice-Randolph |
| Nov 08 Sun | 12:00AM - 03:00AM | offered | Available travel date (NL) | Open | Open | |
| Nov 14 Sat | 12:00AM - 03:00AM | open | Available home ice date | Open | Open | Aspen Ice-Randolph |
| Nov 15 Sun | 12:00AM - 03:00AM | open | Available travel date | Open | Open | |
| Nov 21 Sat | 06:00AM - 07:00AM | pending | Available home ice date (NL) | Open | Open | South Mountain |
| Nov 22 Sun | 12:00AM - 03:00AM | open | Available travel date | Open | Open | |
| Nov 28 Sat | 12:00AM - 03:00AM | confirmed | Game (L) | Freeze PeeWee A | NJ Colonials PeeWee A | Aspen Ice-Randolph |
| Nov 29 Sun | 12:00AM - 03:00AM | open | Available travel date | Open | Open | |

Figure 4b

SEMI-AUTOMATED RECIPROCAL SCHEDULING

CROSS REFERENCE TO RELATED APPLICATIONS

This application is a continuation of, and incorporates by reference in its entirety, non-provisional patent application Ser. No. 12/589,102, filed on Oct. 16, 2009 having the same title and inventors as the present application.

INCORPORATION BY REFERENCE

This application incorporates by reference in its entirety the information from the computer program listing appendix submitted herewith, comprising the files listed in the table below:

| Name | Size | Created |
|---|---|---|
| SourceFile1.txt | 438,577 bytes | Oct. 9, 2009 |
| SourceFile2.txt | 450,145 bytes | Oct. 9, 2009 |
| SourceFile3.txt | 41,835 bytes | Oct. 9, 2009 |
| SourceFile4.txt | 34,661 bytes | Oct. 9, 2009 |
| available_home_ice_date.rb | 3,421 bytes | Oct. 15, 2009 |
| available_travel_date.rb | 3,497 bytes | Oct. 15, 2009 |
| calendar_event.rb | 8,845 bytes | Oct. 15, 2009 |
| game.rb | 3,979 bytes | Oct. 15, 2009 |
| proposal.rb | 7,514 bytes | Oct. 15, 2009 | on the compact disc submitted herewith, and the computer program which is represented by their combination. Two identical discs, each containing the files listed above are submitted herewith.

BACKGROUND

Without automation, scheduling of reciprocal events can be a difficult and time consuming endeavor. For example, in the case of youth hockey, because of the expense associated with ice time and officials, when a game is scheduled at one team's home location, it is often desirable to simultaneously schedule "reciprocal dates" or "reciprocal games" where the team which hosted the first game can be hosted in a second. Currently, the standard approach in youth hockey is to create schedules manually, with a master scheduler spending days and in many cases weeks trying to match the teams in the league with one another while balancing home and away games. There are many problems with this approach, especially as applied in leagues with multiple people responsible for scheduling (e.g., one master scheduler for each organization). First, because master schedulers are generally not professional hockey schedulers, it can be difficult for individuals to coordinate with one another, and to find time to devote to scheduling. Second, in cases where there are multiple master schedulers who meet to create a schedule, there are costs associated with simply setting up a meeting (e.g., money required to rent space, time required for schedulers to travel to the meeting, food and electricity costs associated with running the meeting, etc). Third, actually creating the schedule can be difficult because successful rinks have limited flexibility as downtime is minimize and many leagues are limited to playing games only on specific days (e.g., weekends).

Despite these well known and longstanding difficulties with manual scheduling, attempts at automated scheduling tools, such as LeagueUSA, have not met these needs, largely because they lack the flexibility to allow individual schedulers to perform the (often qualitative) balancing between factors such as team rivalries, distances between teams, and coaches and player preferences which would enhance the scheduling process. Furthermore, they do not allow for identifying reciprocal slots. Additionally, attempts to make scheduling easier by purchasing excess slots have resulted in significantly increasing the costs associated with creating a schedule for a league. As a result, there is a long-felt but unmet need in the field of youth hockey scheduling for an approach which can replace current manual scheduling techniques while still allowing flexibility to consider factors which might be important in a particular instance. Further, other fields which currently use similar methods to those employed in youth hockey scheduling and where a suitable automated technology is not available would also substantially benefit from a flexible automated or semi-automated scheduling technology that allows for identifying reciprocal ice and allows for one or multiple schedulers to schedule with their own preferences.

SUMMARY

Disclosed herein are techniques which can be used in a variety of settings, including facilitating scheduling for teams, organizations and leagues through the identification of reciprocal dates. Various aspects of this disclosure can be implemented in the form of computer readable media which can receive input from users, automatically identify possible opponents and reciprocal dates for a youth hockey team, and generate invitations which can be used to schedule games between the team and one of its possible opponents. In some implementations, the instructions might also configure a computer to allow invitations to be withdrawn, and such withdrawals may be made in a manner which is transparent, so that the possible opponent would not be aware of either the withdrawal or the invitation.

Of course, the teachings set forth herein are susceptible to being implemented in forms other than computer readable media. For example, based on the teachings of this disclosure, one of ordinary skill in the art could implement a system including a database, a server computer and one or more user computers in which the user computers could be used to schedule games for a youth hockey league relying on processing done by the server and information stored in the database. Various other methods, machines, and articles of manufacture could also be implemented based on this disclosure by those of ordinary skill in the art without undue experimentation, and should not be excluded from protection by claims included in this or any related document.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawings and detailed description which follow are intended to be merely illustrative and are not intended to limit the scope of the invention as contemplated by the inventors.

FIG. 2 depicts an architecture which could be used in implementing some aspects of this disclosure.

FIGS. 3a-3j depict calendar interfaces which could be used to facilitate the scheduling of games in a youth hockey league.

FIGS. 4a-4b depict list interfaces which could be used to facilitate the scheduling of games in a youth hockey league.

DETAILED DESCRIPTION

The inventors have conceived of novel technology which, for the purpose of illustration, is disclosed herein as applied to the context of scheduling ice slots for a youth hockey league. While the application of the inventors' technology in the context of scheduling ice slots for a youth hockey league satisfies a long-felt but unmet need in that field, it should be understood that the disclosure of the inventors' technology in that context should not be treated as implying limitations on potential fields where aspects of the inventors' technology can be beneficially applied. Accordingly, the disclosure set forth herein should be understood as being illustrative only, and not limiting.

Figure 1:
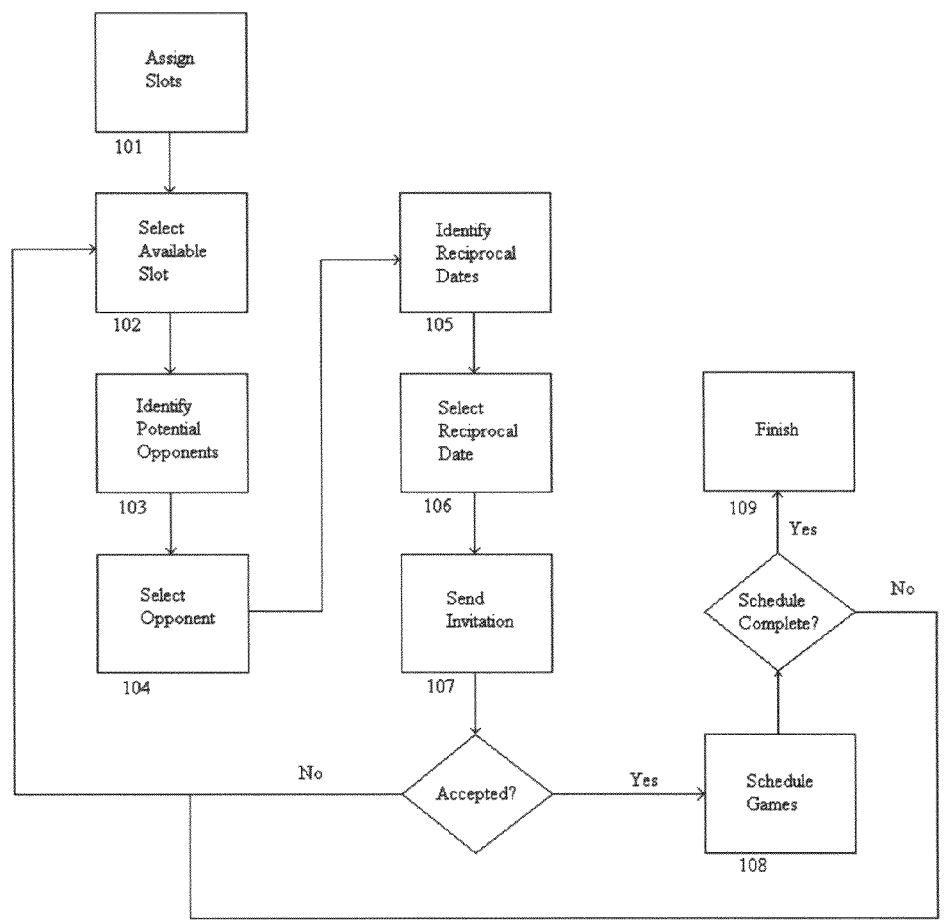
FIG. 1 depicts a process which could be followed to create a schedule for a double round robin youth hockey league.

Turning now to the images, FIG. 1 depicts a process which could be followed by a scheduler to create a schedule for a double round robin youth hockey league. In the process of FIG. 1, the creation of the schedule could begin by defining the events [101] for the various teams in the league. This could correspond to a real world activity, such as buying blocks of time at skating rinks which would be used by the organization and then treating those blocks as potential home games (a first type of event) for their respective teams, and treating dates when a team is available but does not have a potential home game as potential away games (a second type of event). As set forth, this could take place on a league-wide basis (i.e., for all teams in a league) or on an organization by organization level (e.g., there could be a plurality of teams at different age and/or skill levels who would have a common home field and access to commonly purchased blocks of time). This step could also take place in phases. For example, a master scheduler could first determine what days teams in a league are potentially available, and schedule each of those days as potential away games. Then, after the days when the teams are potentially available had been scheduled, blocks of ice could be purchased and allocated to those teams, and the potential away games on dates where ice had been purchased could be converted into potential home games corresponding to the purchased blocks. Of course, other variations are also possible, and may be implemented based on regional preferences or conditions. Accordingly, the discussion of assigning events [101] should be understood as being illustrative only, and not limiting.

However it takes place, once the events for the league had been assigned [101], games could be scheduled on a team-by-team basis. To do this, the manager could select a potential event [102] for a team and the other teams in the league which are available for that potential event could be identified [103]. For example, if the potential event is a potential away game event where a team can play an away game between 11:00 am and 5:00 pm, a computer program could be used to identify teams which had potential home game events which started on or after 11:00 am and on or before 5:00 pm. Using some criteria (or randomly) the manager could select one of the potential opponents [104], and then identify reciprocal dates [105] which are available for the opponent to play its second game against the team being scheduled. The manager would then select a reciprocal date [106], and send an invitation [107] for the games to the coaches of the selected teams. If the invitation is rejected, then the process could return to selecting a different potential event [102]. If it is accepted, the games could be scheduled [108] and a check could be performed to see if the schedule for the league was complete. If it was (e.g., if each team had had two games scheduled with every other team) then the scheduling process could finish [109], perhaps by allowing individual coaches to schedule non-league games for potential events which weren't used for games. If the scheduling process was not finished, then the described sequence of events could be repeated starting with the selection of a potential event [102] to schedule an additional game.

In performing a process such as described with respect to FIG. 1, a number of tools could be used. One such tool is a networked computer system such as shown in FIG. 2. Such a system could operate by storing information regarding the teams in a database [201], then accessing that database using a server computer [202] in response to signals received from a user computer [203] over a network [204]. In some embodiments, the network [204] could be the Internet, and the server computer [202] could be configured to send signals to the user computer [203] which would cause the user computer [203] to display interfaces which would facilitate the scheduling process. FIGS. 3a-3g, discussed below, provide examples of such interfaces, and show how a networked computer system such as depicted in FIG. 2 could be used to schedule games on a team-by-team basis.

Figure 3A:
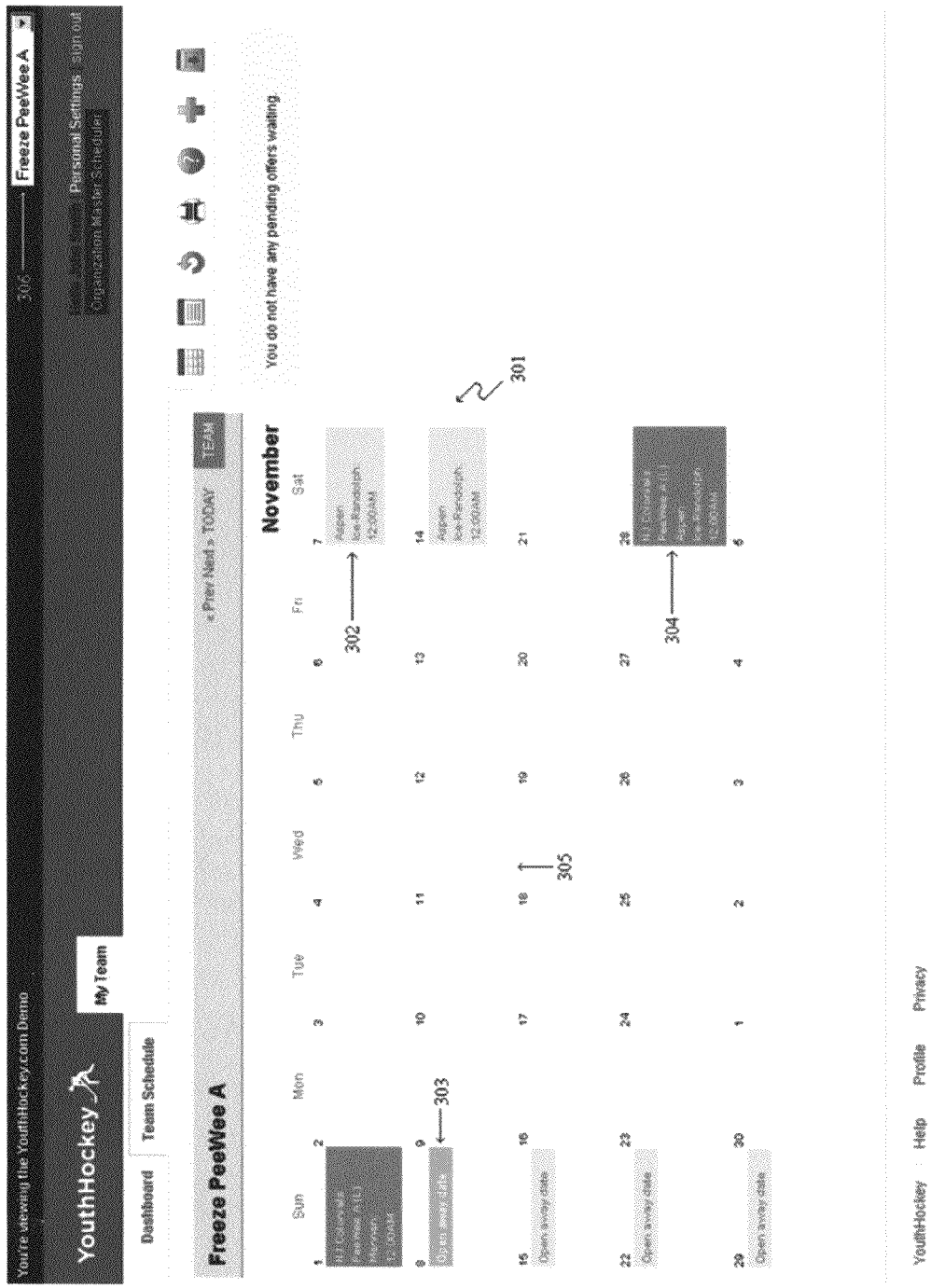

FIG. 3a depicts an exemplary interface which both displays information about a team's schedule, and allows a user to schedule matches for that team. In the interface of FIG. 3a, a calendar [301] is shown which presents the user with a plurality of slots [302][303][304][305] which are either associated with potential events (as shown in the yellow potential home game event [302]), associated with pending events (i.e., offers which can be accepted or declined, as shown in the orange pending slot) [303], associated with scheduled game events (e.g., as shown in the green scheduled game slot [304]), are empty (as shown by the blank slot [305]), or have some other state (e.g., associated with practice events, or with miscellaneous events such as dinners). The interface of FIG. 3a also includes a team selector [306], which could allow the user to view the events slots from the perspective of different teams, depending on the user's permissions and the implementation of any particular system.

In using the interface of FIG. 3a, the process of scheduling a match could be initiated by a user selecting a potential event [302], such as by clicking on it, or making some other kind of indication. This could result in a signal being sent over the network [204]. Such a signal could indicate the potential event [302] (or slot) selected by the user, as well as indicating the team associated with the calendar [301] on the interface. Once the server computer [202] receives the indication, it could then process information from the database [201] to identify potential opponents for the team being scheduled. This identification of potential opponents could take a variety of forms, depending on the parameters considered in a particular implementation. For example, if the selected potential event [302] was a potential home game event (as indicated), the server computer [202] could query the database [201] to determine what teams had potential away game events scheduled which had times that started before, and ended after, selected potential home game event [302], and then those teams could be identified as potential opponents. In other implementations, there could be additional filtering. For example, the potential opponents might not only be required to have overlapping potential away game events, but might also be required to not have already scheduled any league games with the team associated with the selected potential home game event [302]. Other implementations, such as those where schedules could be created or modified throughout a season, could use additional or different criteria, such as number of wins, average age of roster, and/or travel distance, to determine what should be considered a possible opponent for the team associated with the selected potential home game event [302].

Figure 3B:

Once the set of potential opponents for the potential home game event [302] had been identified, the reciprocal dates for those potential opponents could be generated to facilitate scheduling of additional games. This could take place by, for each of the potential opponents, identifying the potential home game events for that opponent for which the team associated with the original potential home game event [302] would qualify as a potential opponent (e.g., because of an overlapping potential away game event). With the reciprocal dates determined, a set of data indicating the potential opponents, as well as the number of reciprocal dates for those potential opponents, could be generated and sent to the user computer [203]. While this data could vary between implementations, in some cases, it could comprise instructions which would cause the display of the user computer [203] to be updated, such as to show an interface of the type depicted in FIG. 3b. In the interface of FIG. 3b, there is a listing of potential opponents [307], where each potential opponent is listed along with an indication of currently scheduled games [308], an option for viewing the reciprocal dates for the opponent [309], an option for making a match invitation without reciprocation [310], and (within the option to view reciprocal dates [309]) an indication of the number of reciprocal dates for the potential opponent [311].

Note that, as demonstrated in the interface of FIG. 3b, the information regarding potential opponents can be presented to the user in such a way as to facilitate the selection of an opponent for the potential home game event [302]. For example, in FIG. 3b, the set of potential opponents is displayed so that the opponents where scheduling is most constrained (e.g., those with the fewest reciprocal dates) are presented at the top of the list so that the user can schedule them first, while leaving the less constrained opponents until later which, in some cases, can lead to significant efficiencies in scheduling for teams with limited flexibility in ice slots.

Variations on this theme are also possible. For example, in some implementations, once a match had been scheduled between two teams, those teams would automatically be moved to the bottom of the list, so that the user could focus his or her attention on the still unscheduled teams. Similarly, in some cases the potential opponents might be displayed with an indication of distance between teams (e.g., as indicated by driving distances between home ice for the team being scheduled and its potential opponent) so that a coach could select games with teams that are closer in preference to teams which are farther away.

Of course, it should be noted that this additional information is not limited to being displayed in an interface such as shown in FIG. 3b. For example, in different embodiments, rather than displaying this additional information, the additional information could be considered when determining the set of potential opponents itself (e.g., for an evening game, a team located more than 100 miles away is not to be considered a potential opponent, or the estimated driving time could be appended to the time of the game for the potential home game so that the comparison with the potential away game event would include an accurate reflection of the time required for the visiting team). Also, it should be understood that, while FIG. 3b illustrates an interface which could be presented after a set of potential opponents had been determined, the set of data sent to determine that interface could also include information beyond that displayed in FIG. 3b.

Figure 3C:
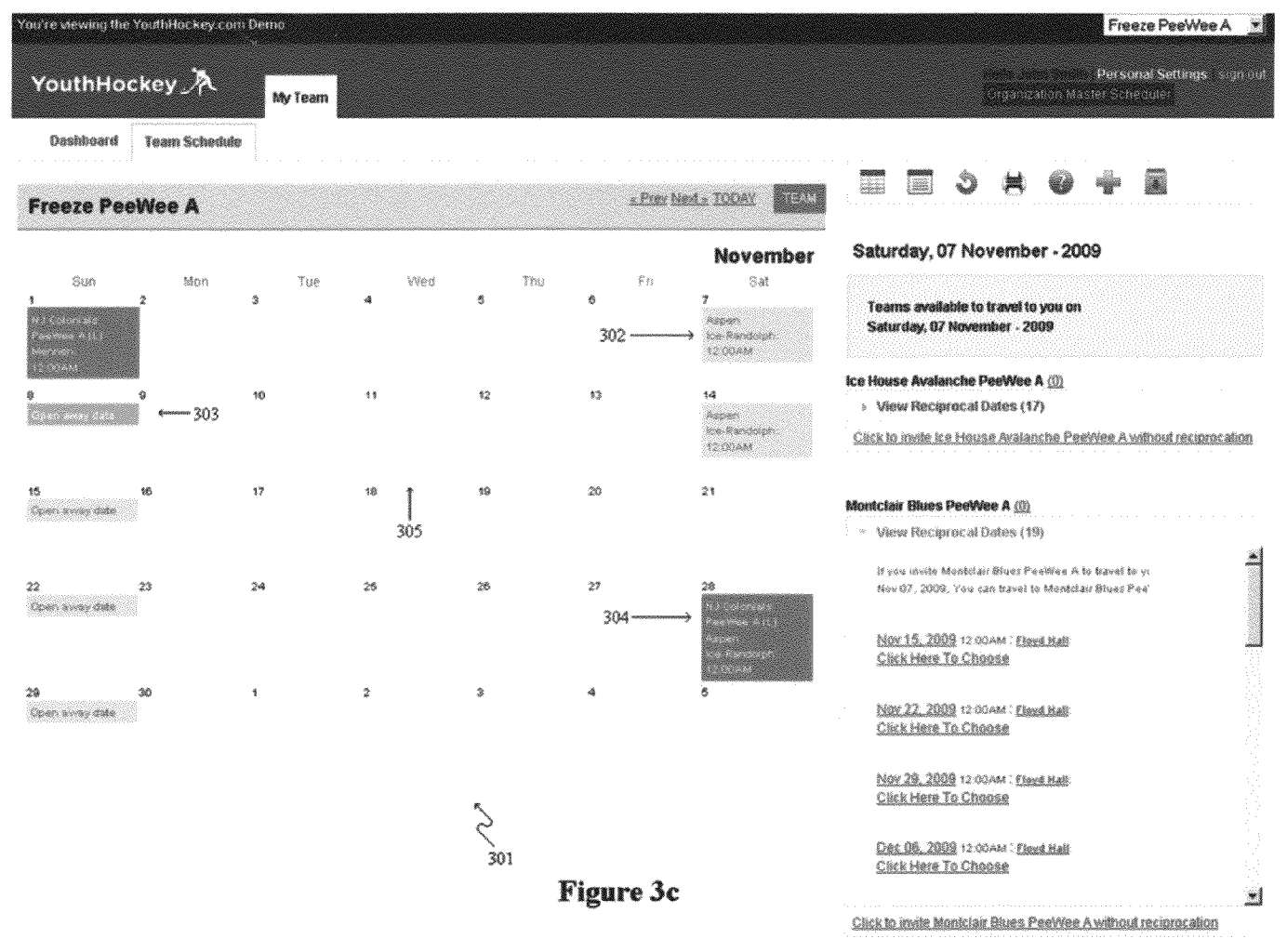
Figure 3D:
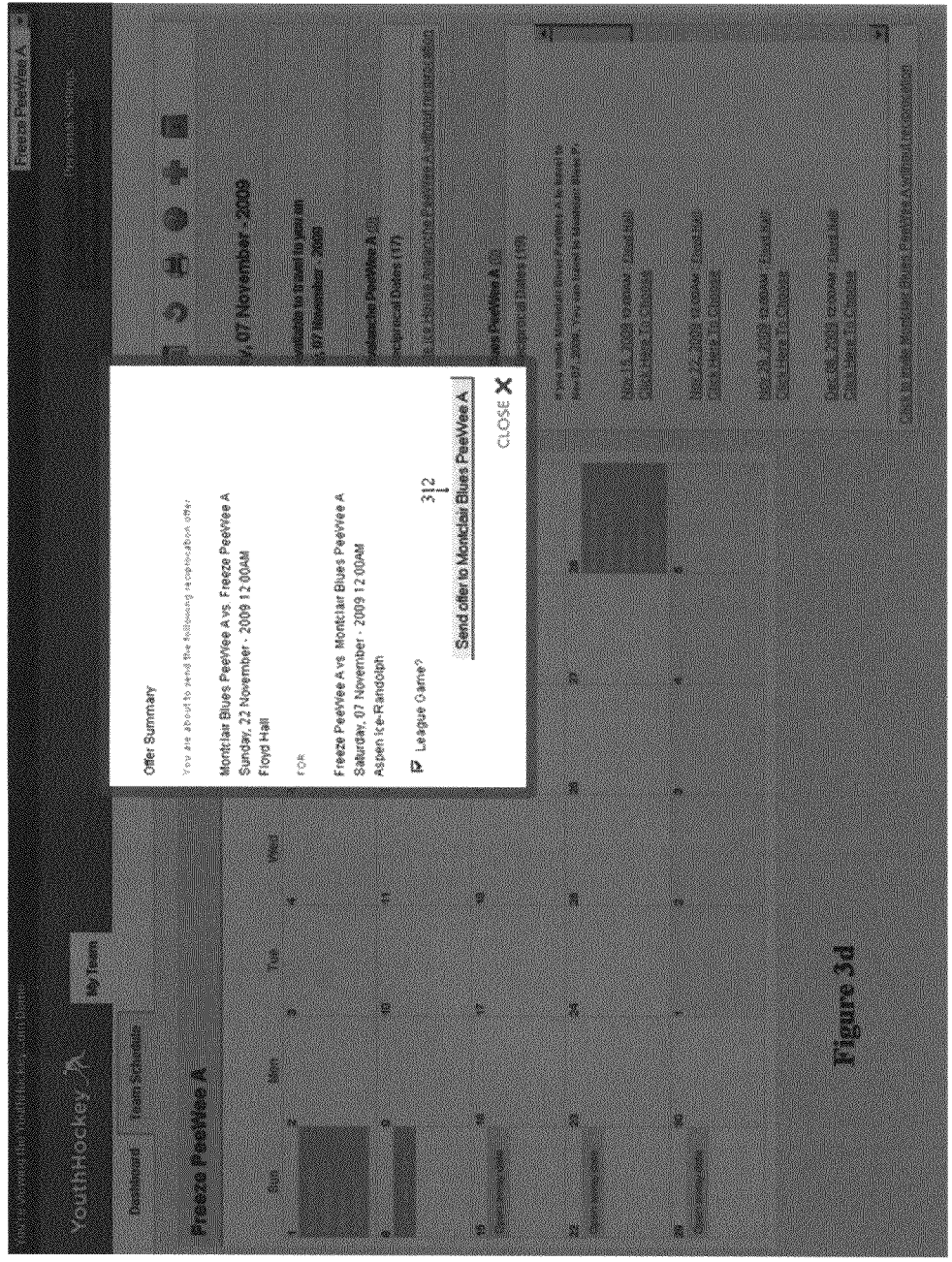
Figure 3E:
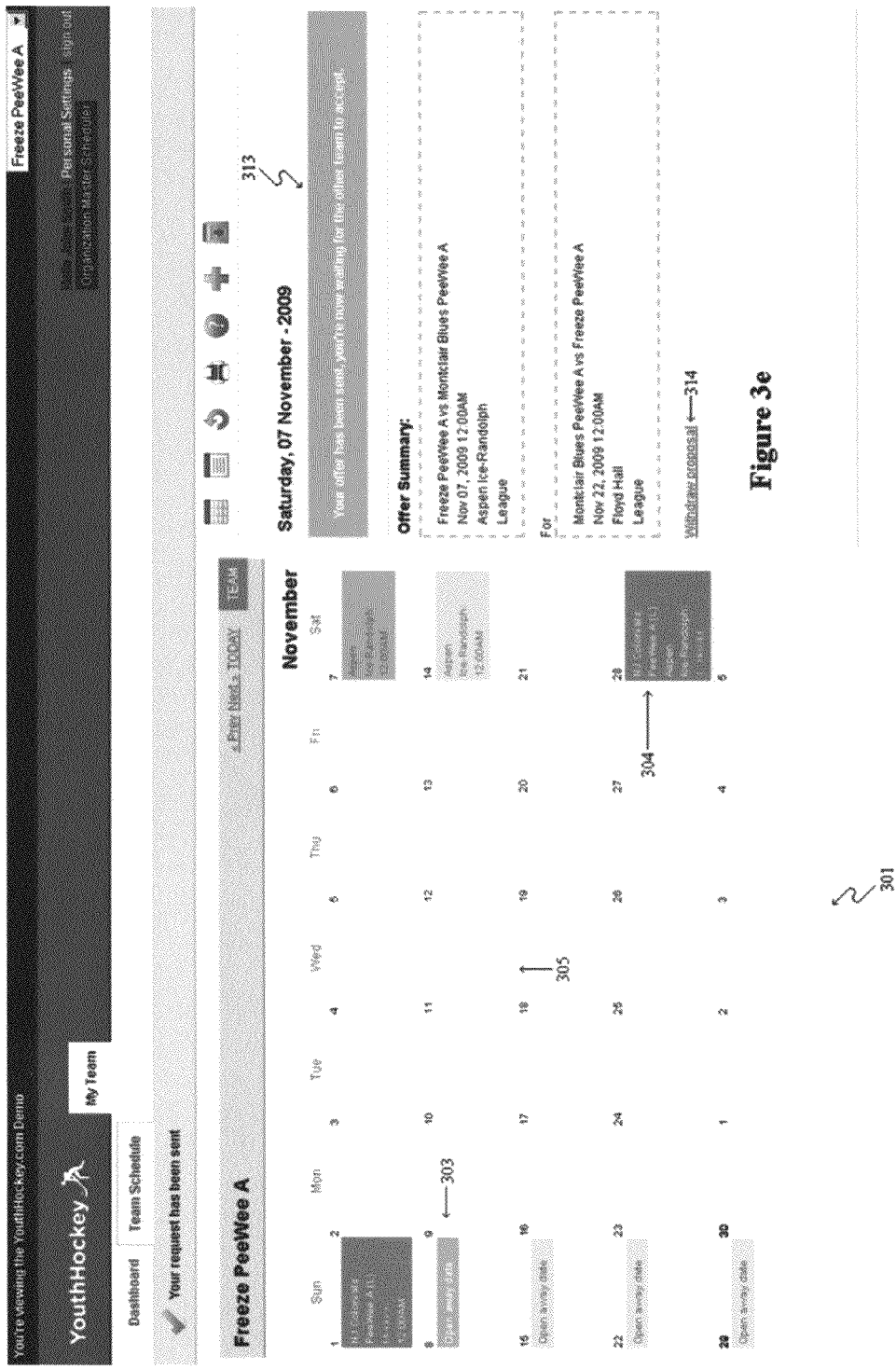
Figure 3F:
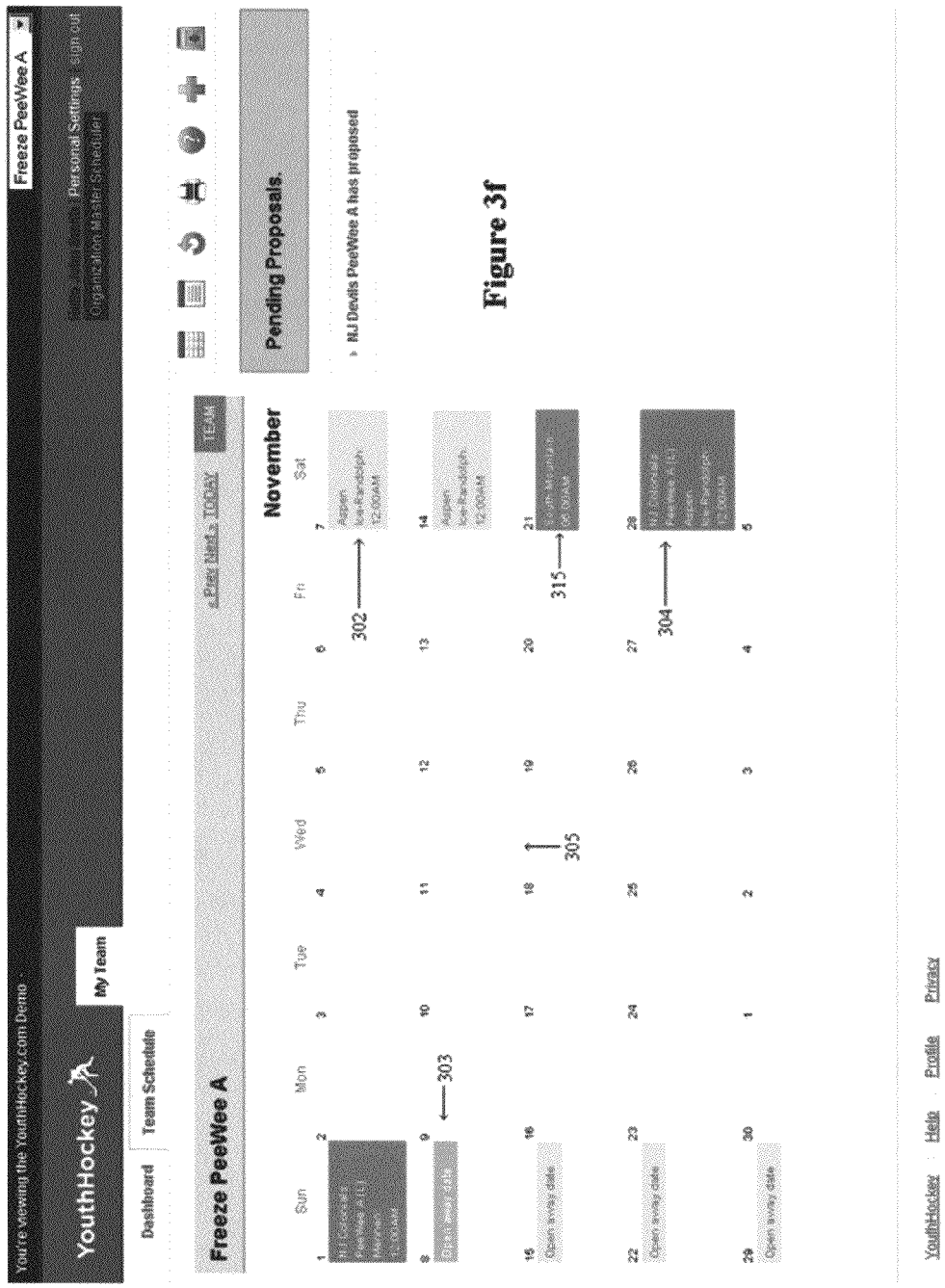

For example, the set of data could include information which could allow the user to view the reciprocal dates for a potential opponent (e.g., using an interface as shown in FIG. 3c) without requiring further communication between the server computer [202] and the user computer [203] once a particular potential opponent is selected. This information could also allow the user to select one of the reciprocal dates, and confirm that the user wished to schedule a game for that date (e.g., using an interface with a confirmation form [312] such as shown in FIG. 3d). Once the confirmation had taken place, the interface could again be updated, such as shown in FIG. 3e, this time with a confirmation message [313] showing the times of the proposed match for the potential home game event and the selected reciprocal date, as well as with a tool [314] which could allow the user to withdraw the invitation before it was accepted.

Figure 3G:
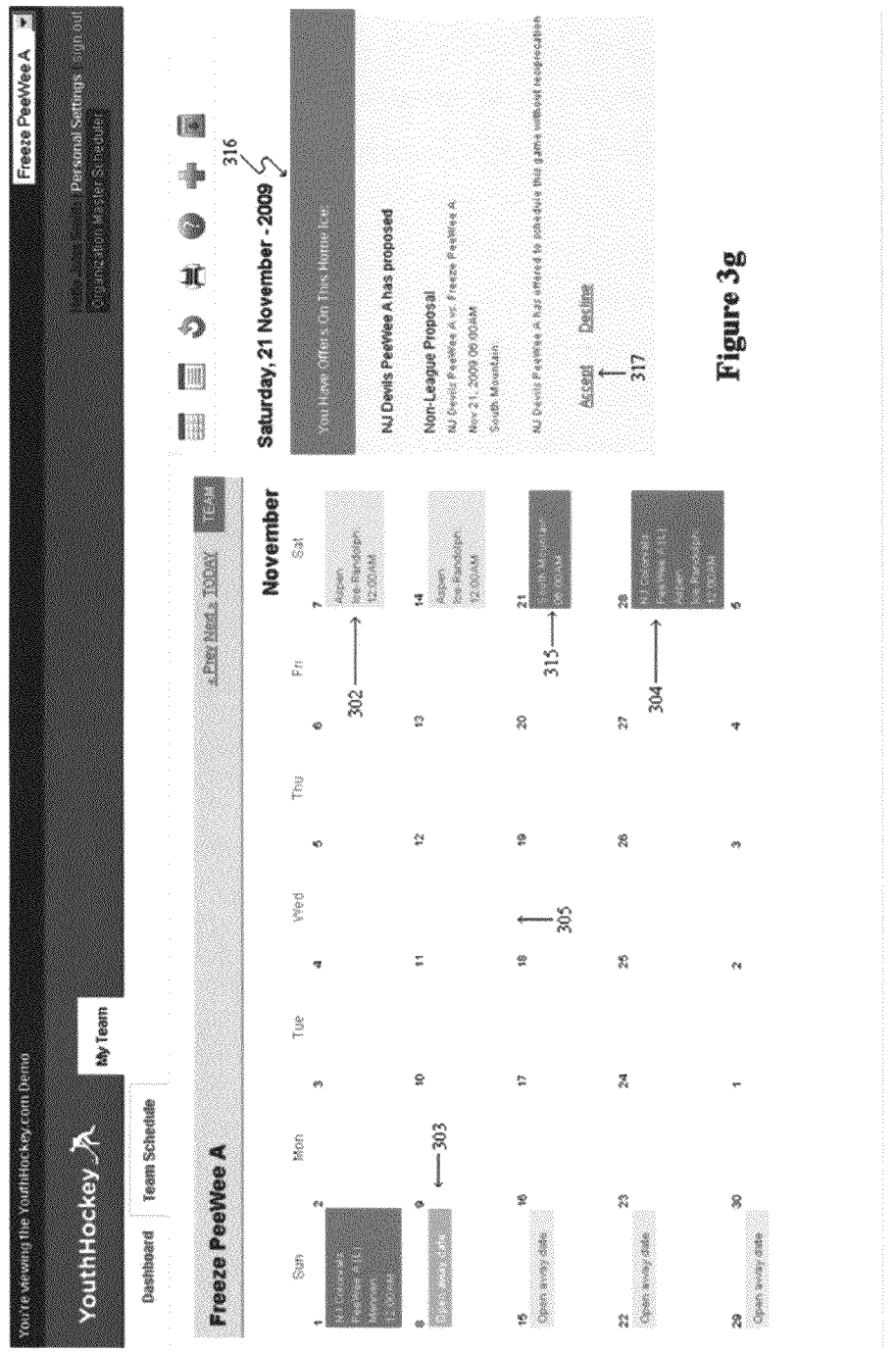

After an invitation had been sent, the final step in scheduling a match (or reciprocal matches, in the scenario where a reciprocal date had been selected) would be for the potential opponent to accept the invitation. This could be facilitated by, when the selected opponent views his or her calendar, including in that calendar a pending proposal slot [315], such as shown in red in FIG. 3f. When the user selected the pending proposal slot [315], the interface presented could be updated as shown in FIG. 3g to include proposal details [316], and a tool [317] allowing the user to accept or decline the proposal. If the proposal were accepted, then a signal to that effect would be sent to the server computer [202] over the network [204], and the server computer [202] would update the database [201] showing that the proposal was accepted and was now a scheduled game. The interface presented to the user could also be updated, such as by replacing the red proposed game event [315] with a green slot showing a scheduled game. This process could then be completed for each of the team's open slots, until each of those slots had been scheduled.

Of course, it should be understood that the discussion above is intended to be illustrative only, and that modifications on the above disclosure are contemplated by the inventors and will be immediately apparent to those of ordinary skill in the art. For example, the example in the above disclosure addressed a situation where a home game event was scheduled by selecting a potential home game event and identifying opponents with potential away game events starting before, and ending after, the potential home game event. However, some implementations could be created to support the opposite approach—where a home game event would be scheduled by selecting a potential home game event and identifying opponents with potential away game events starting after, and ending before, the potential home game event. Similarly, while the above disclosure focused on situation where events are associated with particular teams, it is possible that some implementations might support events for teams that have yet to be determined. For example, there could be an implementation where a master scheduler for an entire league would be able to schedule a tournament or playoff game event in advance by setting information such as location, time, and referees, but would only associate that event with individual teams once it was clear who would be participating in the tournament or playoff.

Combined approaches are also possible. While many organizations purchased ice from a rink and then schedule, a few rink owners also run their own travel organizations and therefore have greater flexibility in scheduling. In such a case, the rink may may preassign slots to hockey games or allow for games to be played any time during their business hours (with or without limitations). In such a case, the team might be assigned a potential TBA (To Be assigned) home game event, to represent the team both has ice available for a home game, and that it could potentially travel on that date. In terms of matching for reciprocal ice, potential to be announced home game events could be treated as either potential home games, or as potential away games, depending on the availability of opponents on any given day. In some implementations, a system could allow for many teams to use TBA's slots for the same day, with allotment of home slots assigned on a first come first serve basis, with or with out limitations. For example 10 teams can designated a day TBA with only 4 TBA's available. Once the four slots are scheduled the remaining TBA's on that particular day would become available travel dates. In addition, each team can be restricted to a specific number of TBA home slots. So a team can be allocated 10 TBA's but designate 30 days as TBA's, but once a team uses it s allotment, the remaining potential to be announced home game events could be converted into potential away game events, and scheduling could continue as normal.

Further variations, such as implementations where multiple events are scheduled on single days (e.g., one day could have both a potential to be announced home game and a potential away game event scheduled), or where scheduling gives preference to certain types of events (e.g., for matching reciprocal ice, events based on set blocks of time could be scheduled before more flexible events). Accordingly, the discussion above of potential to be announced home game events, as well as how they could be incorporated into a scheduling system, should be understood as being illustrative only, and not limiting.

Regardless of the types of events and matching techniques used in a particular implementation, as described above, a schedule for a youth hockey league could be easily created by repeating the selection/invitation/acceptance cycle until a team's entire schedule was defined, then moving on to the next team and repeating for each team. However, the described approach is just one in which the teachings of this disclosure, including the automated identification of reciprocal dates, could be used to generate a schedule for youth hockey league. For example, in some implementations, instead of relying on scheduling home and away games simultaneously using reciprocal ice, the balance between a games home and away events could be maintained using a location bank. To illustrate this approach, consider the case of a league which is run on a single round robin (i.e., each team plays each other team one time) or power matched (i.e., teams are separated into groups based on results, and play other teams in the same groups) schedule. In such a case, the same types of interfaces as described above could be used to schedule games, with a slot being selected, potential opponents being identified, and invitations being sent. However, when an invitation is sent, instead of identifying a reciprocal date for the same opponents, a counter or other type of tracking variable could be incremented (or decremented) to show the current balance of home games versus away games for the scheduled opponents. Then, when the next game is scheduled, if the team being scheduled had a positive balance (indicating more away games than home games), the event scheduled for that team would be a home game, while if the team being scheduled had a negative balance, the event scheduled for that team would be for an away game, rather than for a home game. Other systems, such as those identifying values other than hosting games and incorporating them into the location balance, could also be implemented. Accordingly the discussion above the team-by-team approach with reciprocal invitations should be understood as being illustrative only, and not limiting.

Figure 4B:
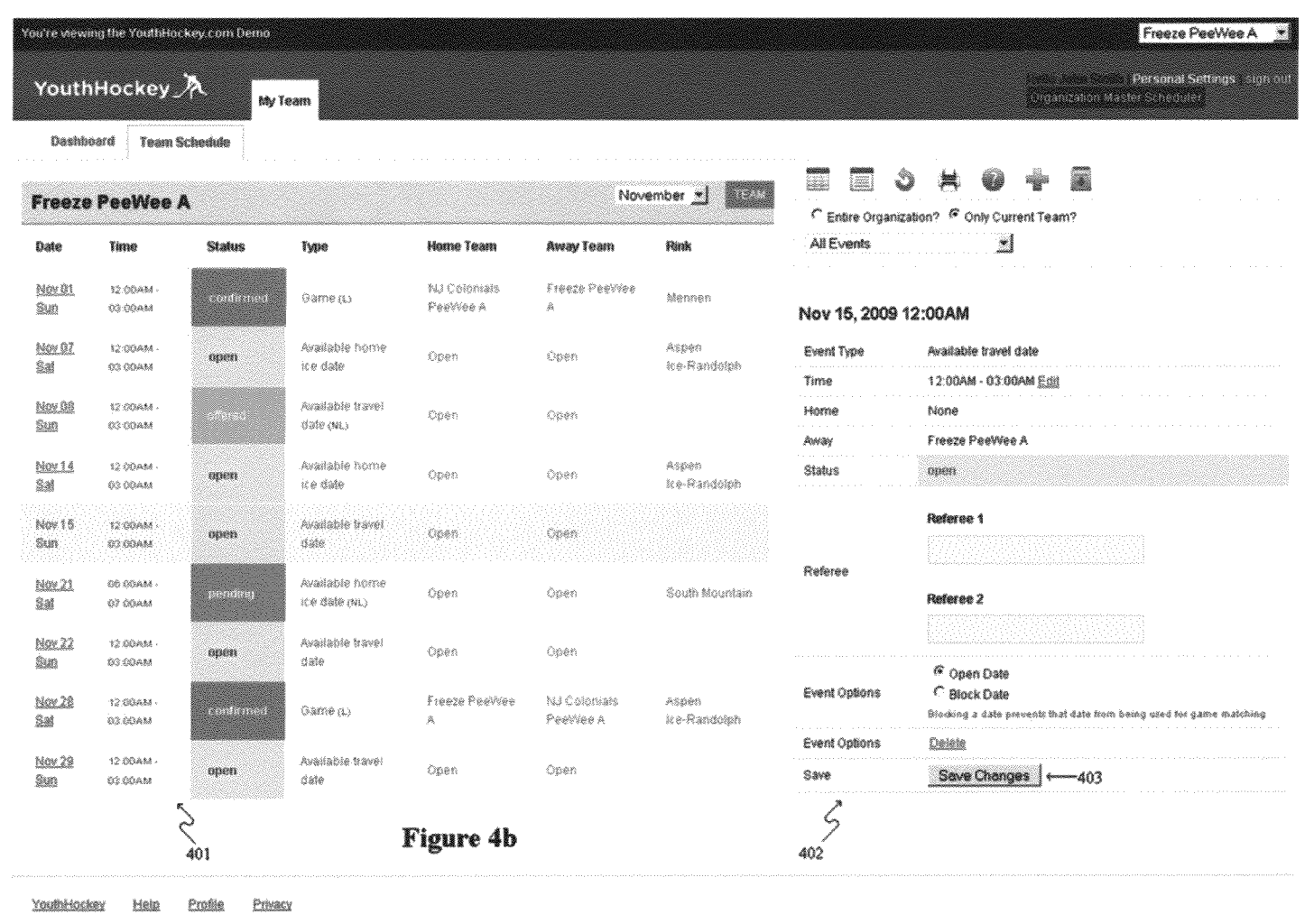

Other types of variations are also possible. For example, while the above disclosure focused on the use of calendar interfaces such as shown in FIGS. 3a-3g, it is possible that other interfaces could be used either in addition to, or as alternatives to, the calendars discussed above. For example, FIG. 4a depicts an interface which presents event slots such as shown in FIG. 3g in a list [401]. Such an interface could be configured to allow a user to perform actions similar to those discussed previously (e.g., accepting invitations, scheduling reciprocal ice), or could be configured to provide different or additional functionality to the user. For instance, a list interface could be configured such that when a user selects an event, the interface would be updated as shown in FIG. 4b, such that a set of editing forms [402] and a save tool [403] would be presented to the user. As shown in FIG. 4b, the editing forms [402] could allow the user to change information about an event, such as times associated with that event, whether the event is available for a game, and whether the event should be deleted. Additionally, other functionality beyond that shown in FIG. 4b could also be included. For example, in a case where a user is responsible for multiple teams, that user might have the ability to select a home event assigned to a first team, and reassign it to a second one of the teams he or she was responsible for. Once the edits had been made, the save tool [403] could be used to allow the user to indicate that editing for the event was complete. This save tool [403] could be programmed to send a signal to the server computer [202] which would cause the server computer [202] to update the database [201] with the changes the user had made.

Figure 3H:
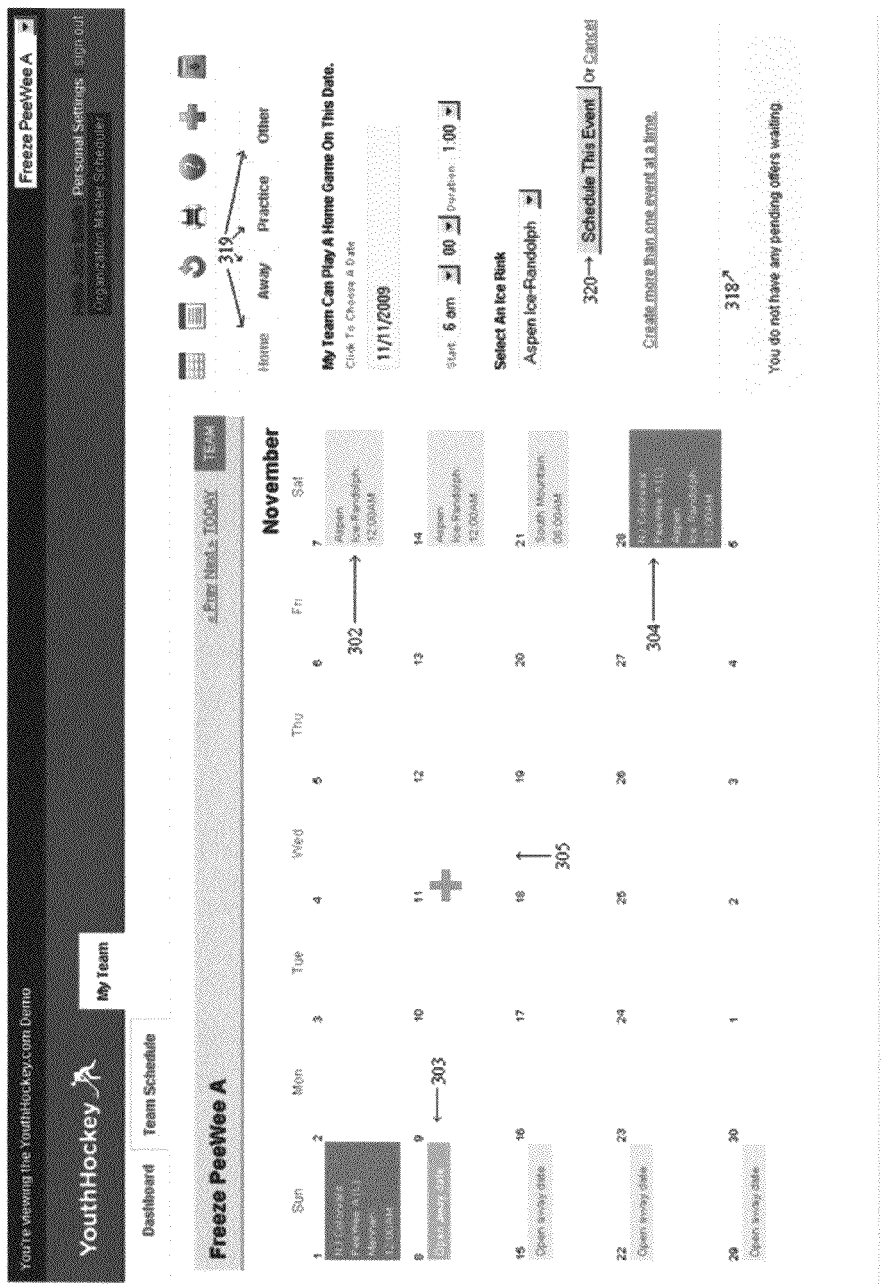
Figure 3I:
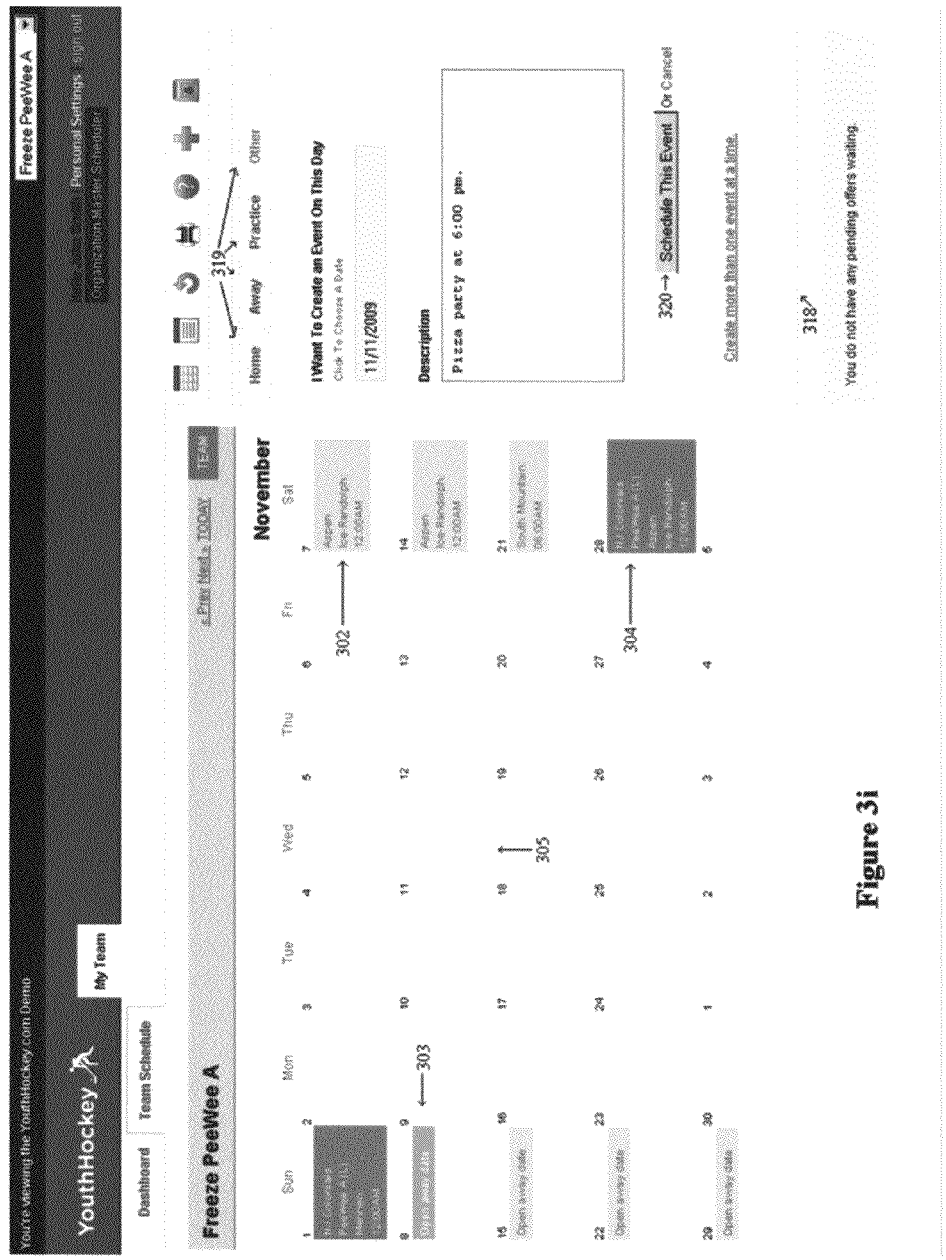

Of course, it should be understood that the discussion above is not meant to imply that calendar interfaces such as shown in FIGS. 3a-3g cannot be used to modify events, or that list interfaces such as shown in FIGS. 4a-4b cannot be used to create invitations or schedule reciprocal ice. It is possible that in some implementations a calendar (or list) interface could allow both editing of events and creation/acceptance of invitations, potentially accompanied by additional functions as well. Also, while the above disclosure focused on scheduling events which were already allocated for games (e.g., potential home game events), it should be understood that systems implemented following the teachings of this disclosure are not limited to those which only manage pre-existing events. For example, in a calendar style interface such as discussed above with respect to FIGS. 3a-3g, if a user selects a blank slot [305], then he or she might be presented with an event creation tool [318] such as shown in FIG. 3h. As shown in FIG. 3h, the event creation tool [318] can be implemented to include a plurality of tabs [319] which allow the user to select whether the event to be created is a (potential) home or away game, a practice, or some other type of event. With these tabs activated, the user can set information for particular types of events. For example, in FIG. 3h, the home game tab is activated, and tools are presented so the user can identify the date, time and location for a game that would be considered a home game for purposes of reciprocal ice and league scheduling. Similarly, FIG. 3i illustrates an interface which allows the user to create a miscellaneous type event, accessed using the "Other" tab. Once the information had been entered, the user could activate the "Schedule Event" form [320], which would cause the information related to the newly scheduled event to be sent to the server computer [202] and stored in the database [201].

As is the case with scheduling games, variations on scheduling events (e.g., potential home or away games) are also possible. As an example of this, consider FIGS. 3j-1 and 3j-2, in which the combination of those figures with the bottom of 3j-1 connected to the top of 3j-2 depicts an interface which can be used to schedule weekly repeated events. In those figures, a user can use the start [321] and stop [322] date controls to indicate the time period over which the repeated events will take place. The user can also identify dates which should be excluded from the repeated event schedule by entering a list of such dates into the exclusion form [323]. Thus, if a user wished to schedule potential home game events every Friday between Nov. 6, 2009 and Jan. 29, 2010, but excluding Christmas and New Year, the user could enter Ser. No. 11/062,009 into the start date control [321], Jan. 29, 2010 into the stop date control [322], and Dec. 25, 2009 and Jan. 1, 2010 into the exclusion form [323]. Similarly, approaches to scheduling other types of repeated events (e.g., practices, away games) could be used by selecting the tab [319] to indicate the type of repeated event to be scheduled. Other types of variations, such as scheduling repeated events on other than a weekly basis (e.g., practice every weeknight) could also be implemented. Accordingly, FIGS. 3h-3j, as well as the accompanying disclosure, should be understood as being illustrative only, and not limiting on potential implementations of the inventors' technology.

Additional functionality, beyond adding and scheduling events could also be included in systems implemented using aspects of this disclosure. For example, in addition to (or as an alternative to) data regarding scheduling, a database [201] such as shown in FIG. 2 could also include information specific to the games and players who participated, such as a game score, number of goals or assists for a player, a player's contact information, cumulative goals scored by and against a given team, or other information which could be appropriate for a given application. As another example of additional functionality, some systems might identify different user roles, and provide users with different data access and modification rights based on their role. To illustrate this concept, consider a case, discussed below, where users are assigned one of three roles: master scheduler, team manager, and player.

In a case where users had roles of master scheduler, team manager and player, the master scheduler could be given the broadest access rights. For example, the system could be implemented so that only the master scheduler would have the right to schedule league games. The master scheduler might also be responsible for initially scheduling potential home and away games for the teams in a league, such as by using tools such as described above with respect to FIGS. 3h-3j. The team manager could then be presented with a reduced set of functionality. For example, in some implementations, a team manager could schedule non-league games (perhaps only after all league games had been scheduled), but might not be able to schedule games for the league itself. Similarly, a team manager might be limited to accessing (or modifying) information related to his or her own team, while the master scheduler might be given broader access (or modification) privileges, such as privileges covering an entire league, or covering an entire set of teams making up an organization (e.g., multiple Freeze teams for players of different age levels). Players might be given an even more reduced set of functionality. For example, a user with the role of player might be limited to view only access, such as being able to view, but not modify, the league schedule or statistics. Further, in a manner similar to that described above regarding limiting team managers to only accessing (or modifying) data related to their own team, in some cases a user with the role of player might only be able to view his or her own statistics, rather than viewing the statistics of other players or players on other teams.

Of course, variations on the above rights allocations are possible. For example, in some cases, rather than limiting the ability to assign home or away events to the master scheduler, there might be functionality which would allow team managers to allocate new events, such as if they purchase time directly from a rink. Similarly, in some cases, rather than requiring a master scheduler to allocate events as home or away, a system could be programmed to initially create a random allocation of home and away games (balanced between home and away for any one team), which would both remove that administrative burden from the master scheduler, and avoid potential charges that events were allocated due to favoritism. As yet another variation, in some cases a system could be implemented with different roles than described, such as by including only players and team managers, but omitting master schedulers. In such a case, initial home and away events could be purchased by the organization and allocated randomly to the teams, and the team managers would be responsible for scheduling both home and away games, such as by using interfaces such as discussed herein. Variations with more roles, such as roles for parents or coaches are also possible. Accordingly, the above discussion of roles using the master scheduler, team manager and player roles should be understood as illustrative only, and not limiting.

There could also be variations on how underlying systems and data models could be used and implemented to provide functionality such as described. For example, some implementations might follow the popular model-view-controller architecture, in which information in the database [201] could follow a data model such as depicted in FIGS. 5a-5d, in which those figures could be combined to form a single figure with FIG. 5a in the upper left quadrant, FIG. 5b in the upper right quadrant, FIG. 5c in the lower right quadrant, and FIG. 5d in the lower left quadrant. In that model, different slots, such as depicted in the calendar interface of FIG. 3a could be represented by a base CalendarEvent [501] data type, which could be specialized into AvailableTravelDate [502], CanceledGame [503], Practice [504], Game [505], and AvailableHomeIceDate [506] derived data types. As a further illustration of how such a model could be implemented, the computer program listing appendix submitted herewith contains files which could define and cause a computer to implement aspects of such a model.

Of course, it should be understood that variations on the specific data types depicted in FIGS. 5a-5d are possible. For example, in an implementation which supports events which represent extended time periods during which events can be scheduled, there could be a TBAEvent type, similar to (or perhaps as an extension of) the CalendarEvent [501] type depicted. Such a TBAEvent type could include data members such as individual slots into which the larger time period is divided up, restrictions on assignments for slots (e.g., games or practices for peewee teams might be limited to afternoon slots), exception periods during which an event could not be scheduled, and other data as appropriate in a particular implementation. Additionally, different systems could also track data not depicted in the data model of FIGS. 5a-5d. For example, there might be a case where there are different types of slots, such as slots represented by TBAEvents, and slots represented by CalendarEvents [501]. In such a case, if one type of slot is seen as more desirable than another (e.g., TBAEvent slots might be seen as more desirable due to their flexibility) a system could track how many of the more desirable slots had been used by a particular team or organization, and prevent that team or organization from overusing the more desirable slots once some threshold utilization of those slots had been reached (e.g., the system could initially display all of an organization's TBAEvents for a team, but once the team had used a threshold number of TBAEvents for scheduling, no further use of TBAEvents would be allowed, even if there were still TBAEvents available for other teams in the organization).

Whatever approach is used to store data, with a data model defined, new events could be created and scheduled could be scheduled using appropriate controllers as shown in FIGS. 6a-6d, which could be combined in the same manner as FIGS. 5a-5d to form a single figure. These controllers could include a HomeIceDatesController [601], which could be used to create new data objects of the AvailableHomeIceDate [506] type. There could be similar relationships between the AvailableTravelDate [502] type and the TravelDatesController [602], and the Practice [504] type and the PracticesController [603]. Other controllers could also be used to perform administrative functions. For example, the LeagueController [604] could be used to create new objects of the League [507] data type, thereby allowing multiple leagues to be run from a single database [201] in a system such as shown in FIG. 2. Similarly, a PlayerAssistsController [605] and a Penalties-Controller [606] could be used to create new objects of the Penalty [508] and PlayerAssist [509] data types, thereby facilitating the maintenance of statistics.

Figures 1, 3J:
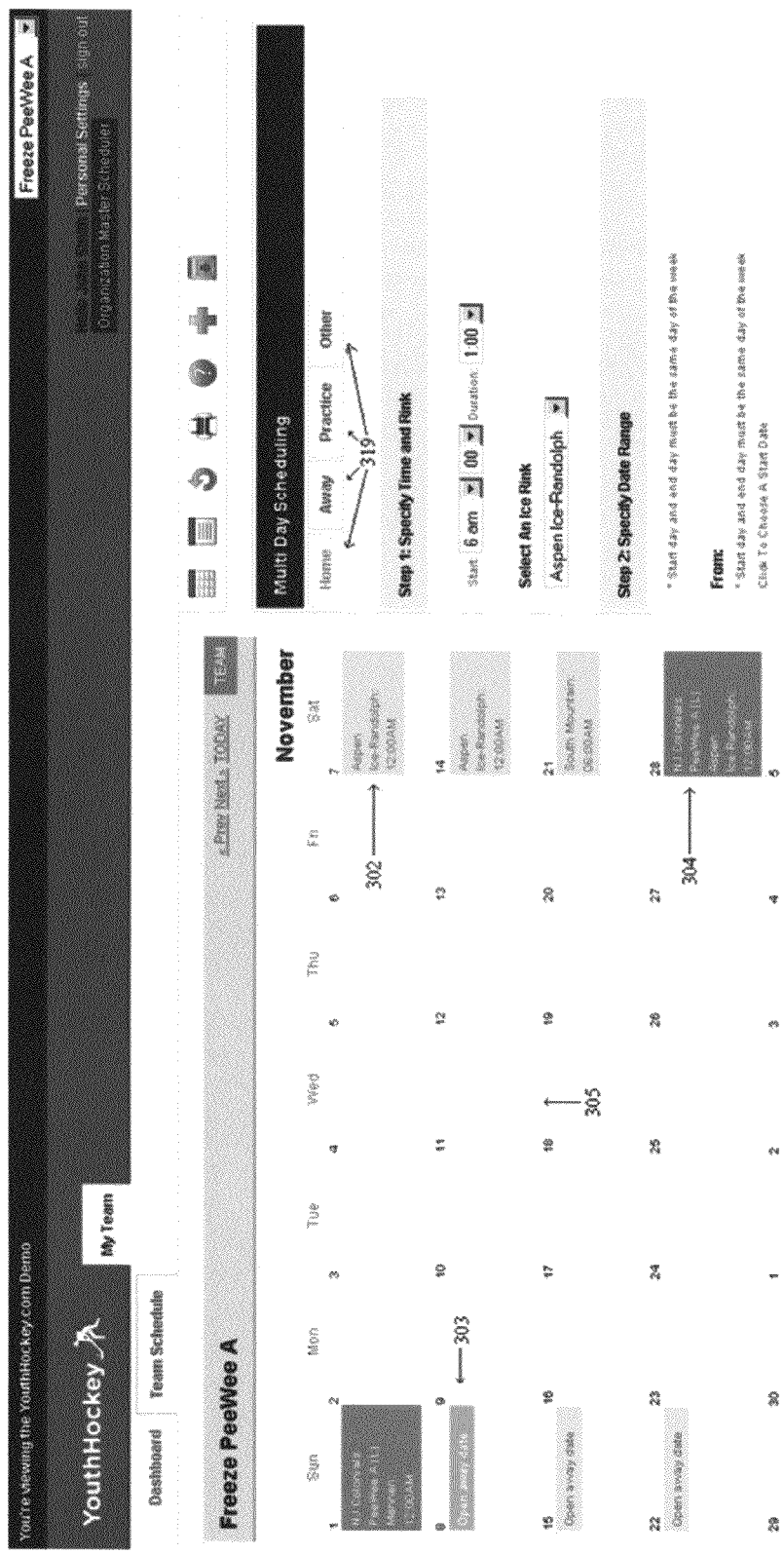
Figures 2, 3J:
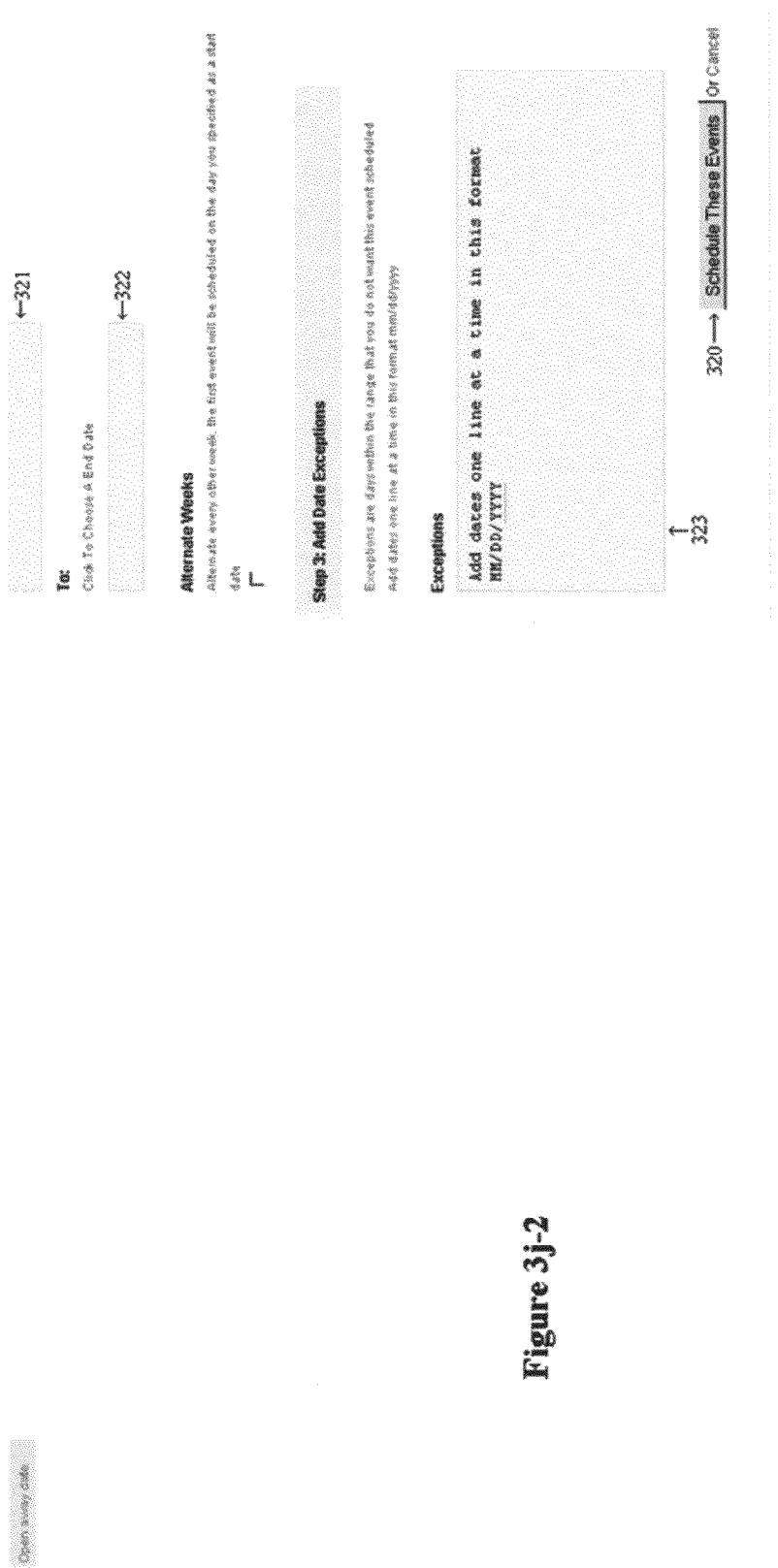
Figure 5A:
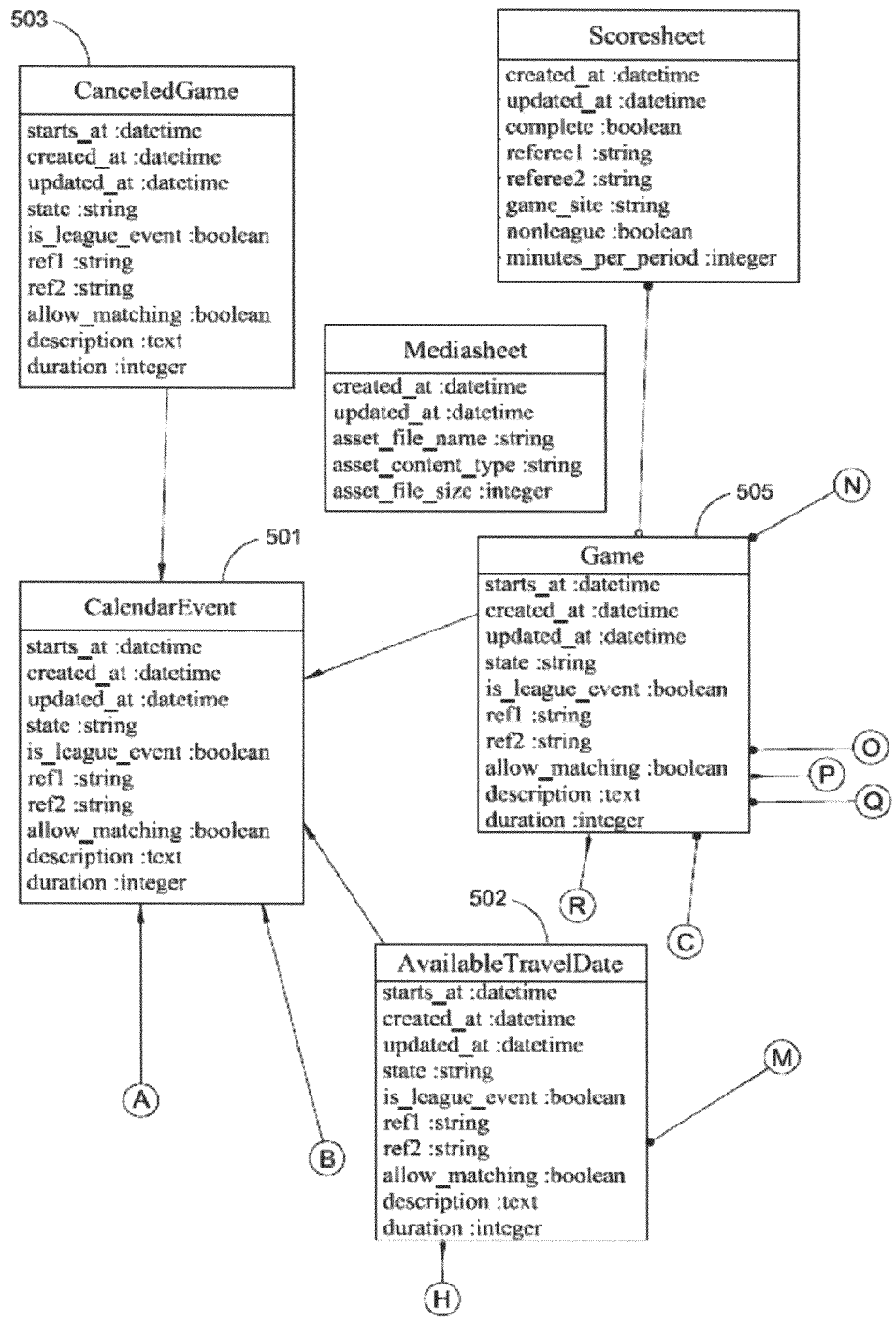
FIGS. 5a-5d depict a model which could be used to implement certain aspects of this disclosure.
Figure 5B:
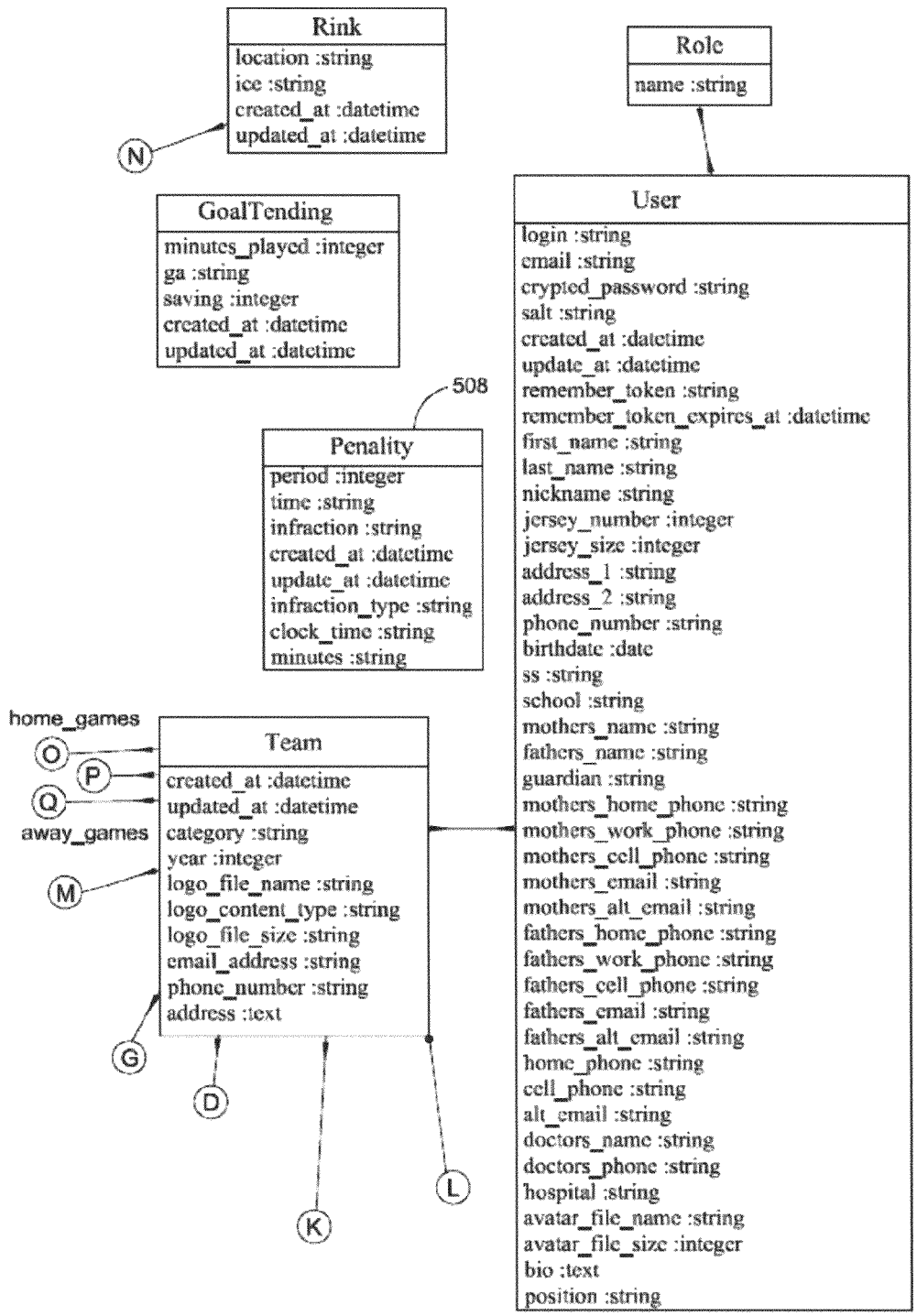
Figure 5C:
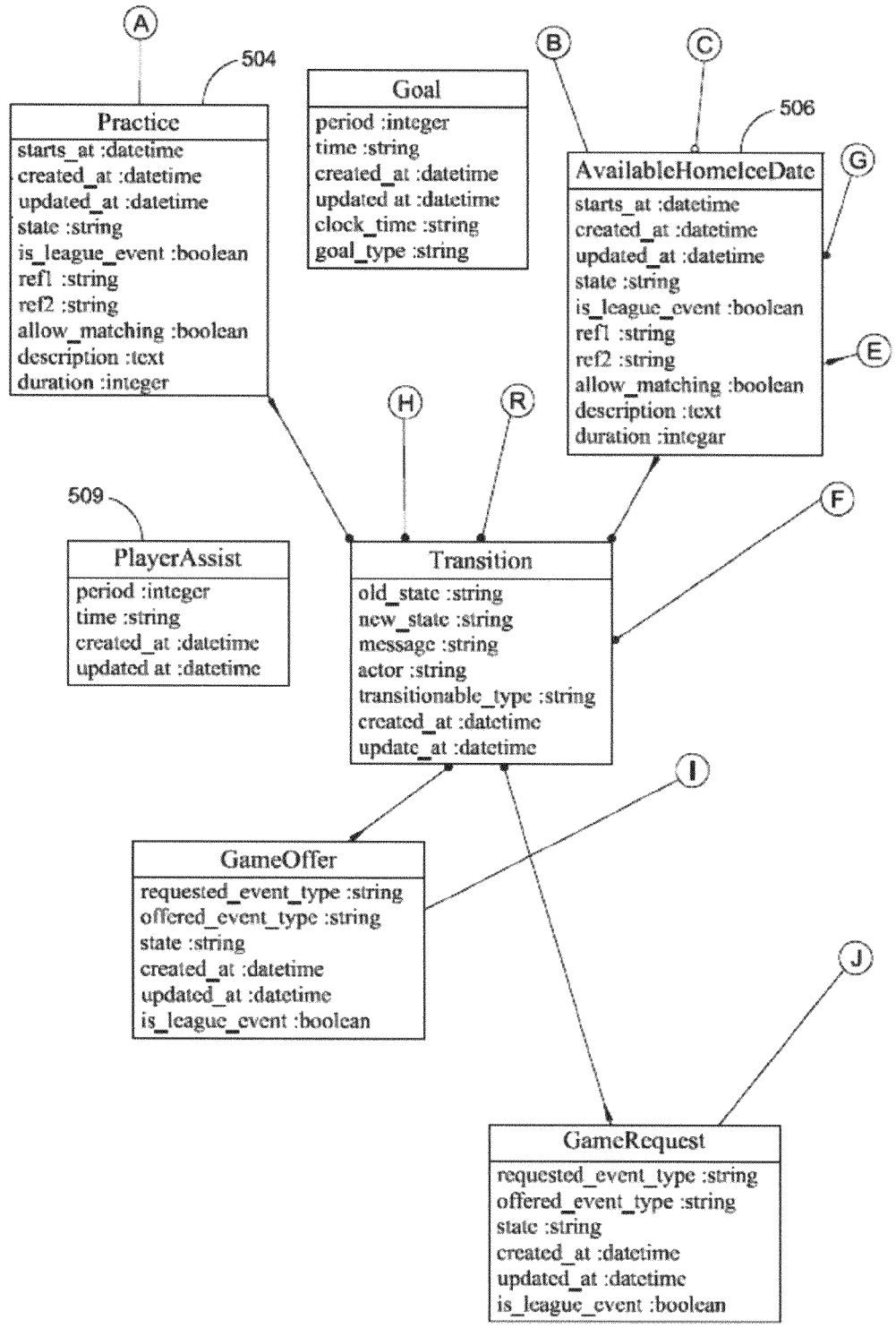
Figure 5D:
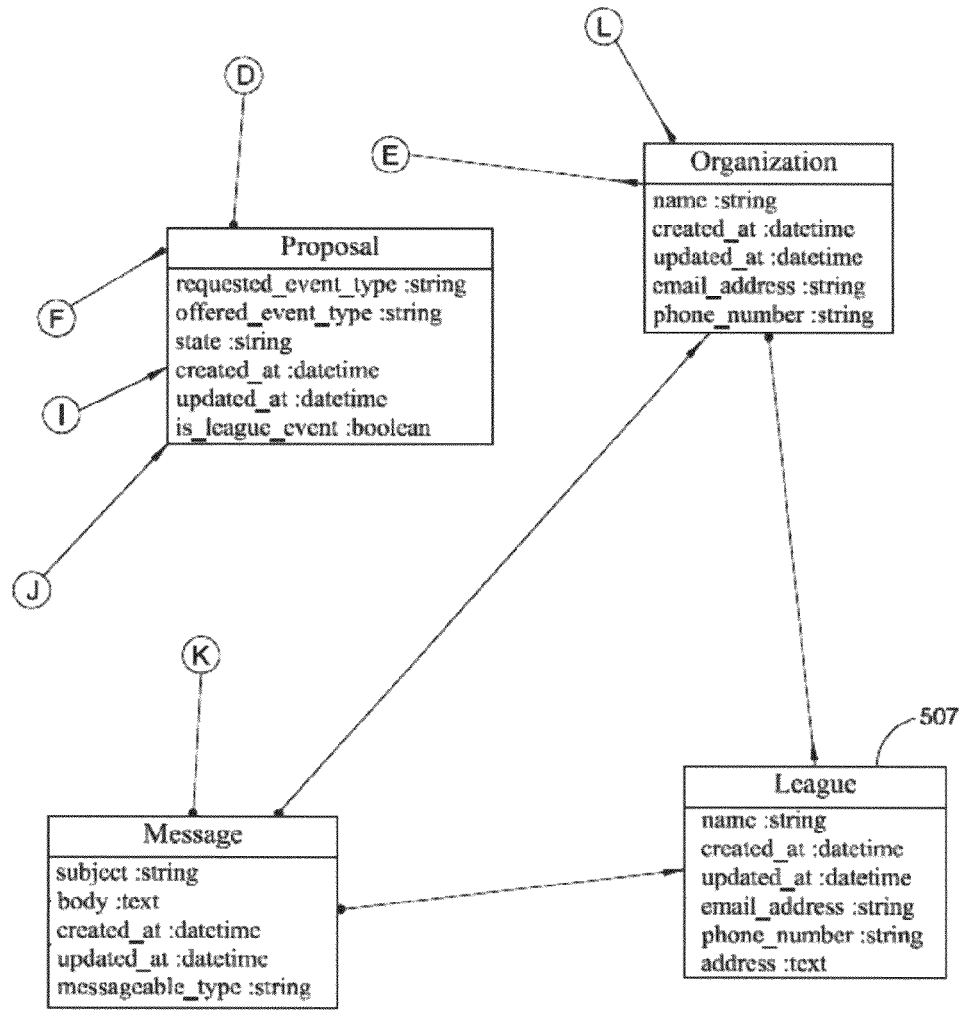
Figure 6A:
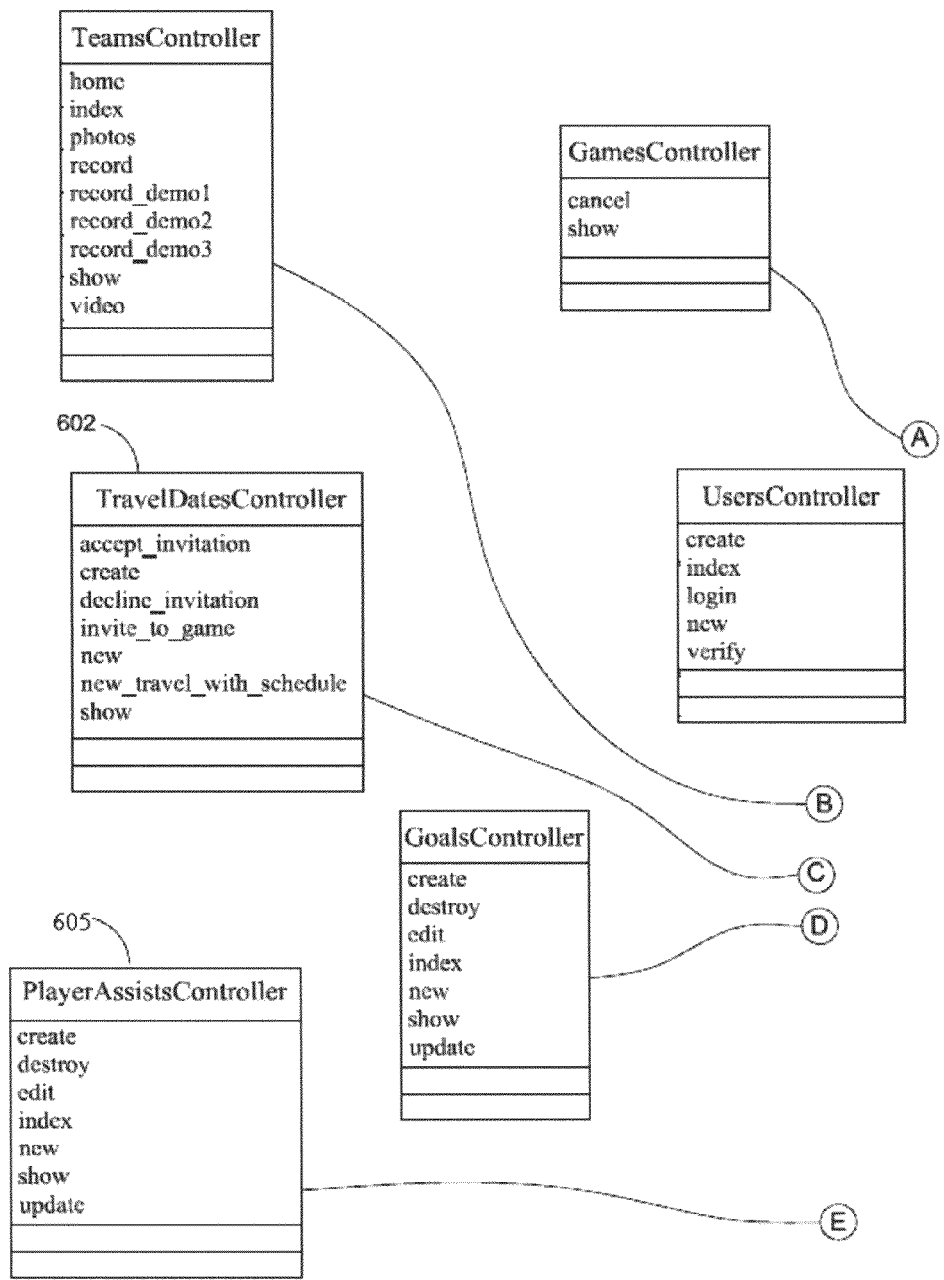
FIGS. 6a-6d depict controllers which could be used to implement certain aspects of this disclosure.
Figure 6B:
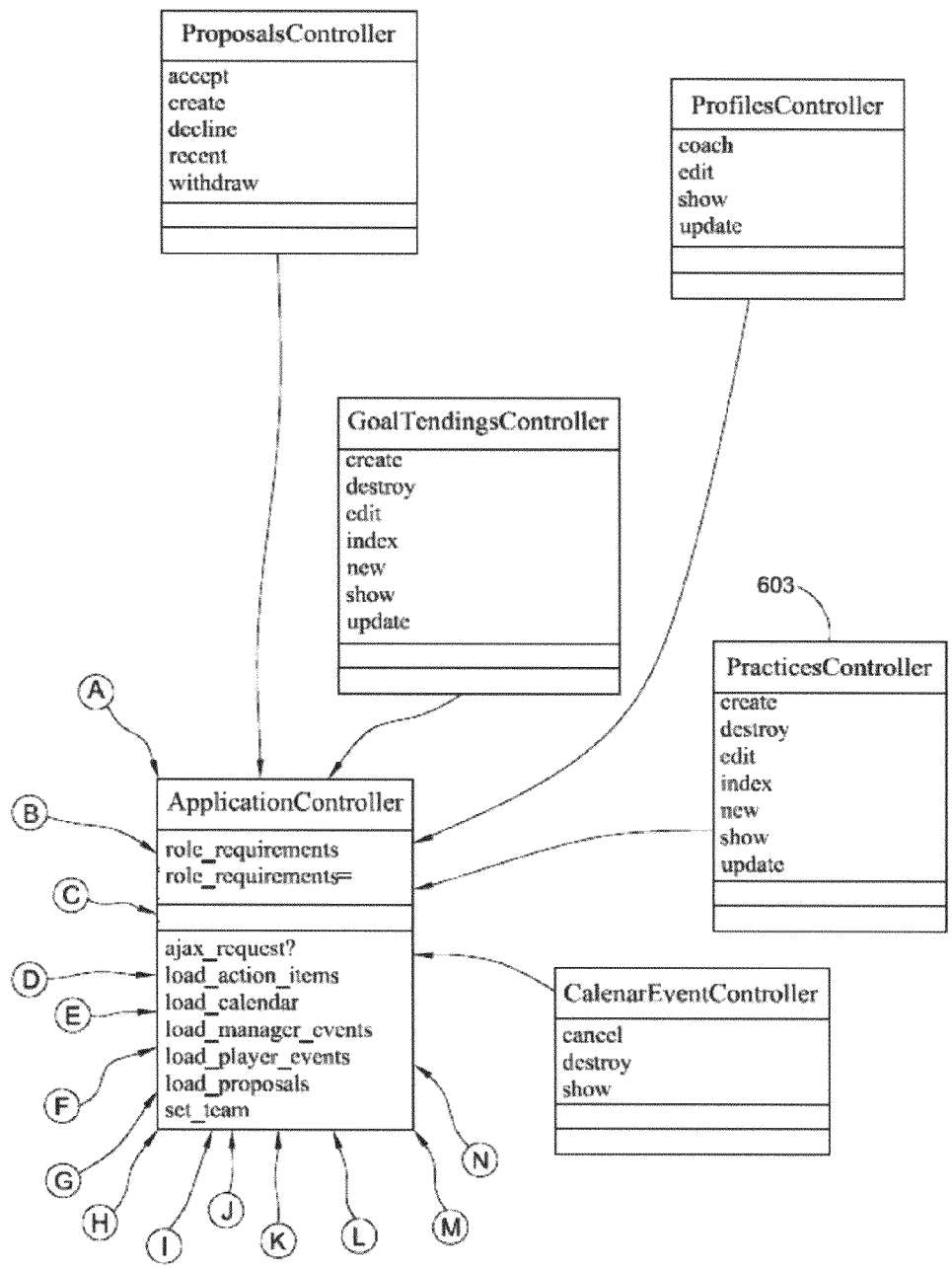
Figure 6C:
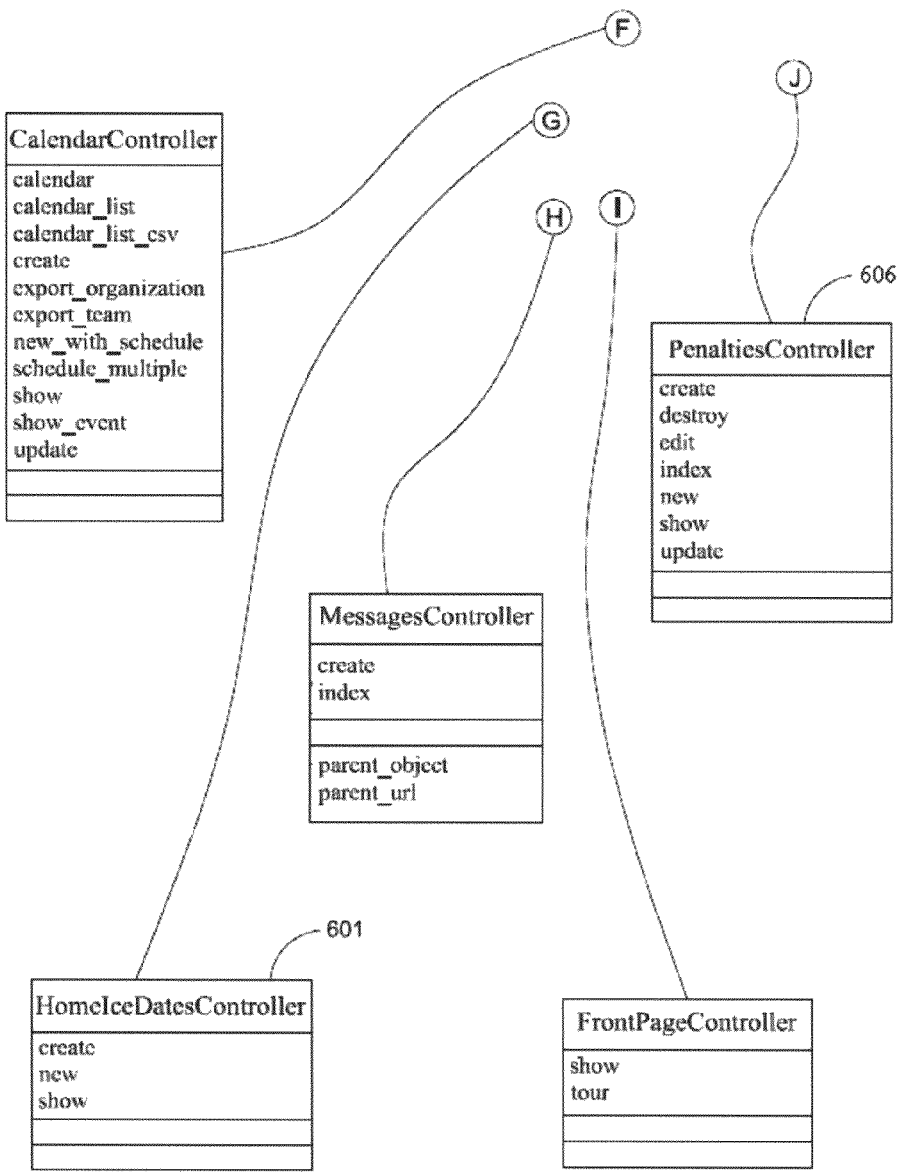
Figure 6D:
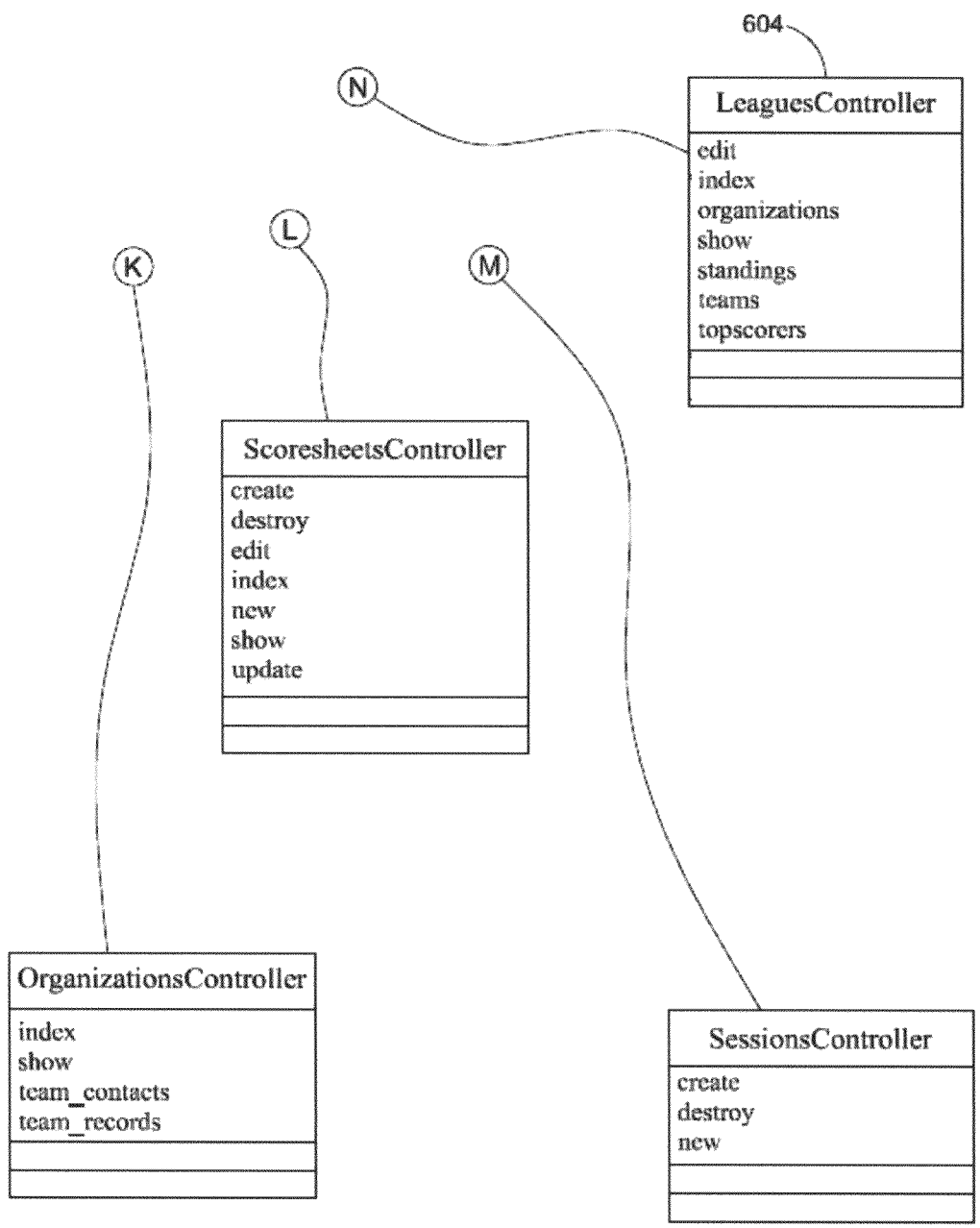

Finally, the views through which the data in the model could be presented could then be implemented in code that would execute on the user computers [203], to present interfaces such as previously described. Examples of this type of code can be found in the computer program listing appendix submitted herewith. In that appendix, SourceFile1.txt corresponds to code which could be sent to a user computer [203] to cause an interface such as shown in FIG. 3a to be displayed. SourceFile2.txt corresponds to code which could be sent to a user computer [203] to cause an interface such as shown in FIG. 3b to be displayed. SourceFile3.txt corresponds to code which could be sent to a user computer [203] to cause an interface such as shown in FIGS. 3j-1 and 3j-2 to be displayed. SourceFile4.txt corresponds to code which could be sent to a user computer [203] to cause an interface such as shown in FIG. 4a to be displayed.

While the above discussion focused on implementations in which games for a youth hockey league were scheduled using automatic identification of reciprocal dates, it should be understood that the disclosure set forth herein is not limited to being implemented in the manners explicitly described. For example, the approaches described herein could be applied in other settings where reciprocal scheduling might take place (e.g., adult sports leagues where playing away games might entail significant travel) or might implement other aspects of this disclosure (e.g., disclosed user roles, or approaches to creating events). Additionally, various aspects of this disclosure (e.g., the invitation/acceptance approach, the data models, etc) might be used in systems which do not include automatic reciprocal scheduling. Accordingly, instead of limiting the protection accorded by this document, or by any document which is related to this document, to the material explicitly disclosed herein, the protection should be understood to be defined by the following claims, which are drafted to reflect the scope of protection sought by the inventors in this document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions

When used in the claims, "cardinality" should be understood to refer to the number of elements in a set.

When used in the claims, "computer" should be understood to refer to a device, or group of devices, which is capable of performing one or more logical and/or physical operations on data to produce a result. Non-limiting examples of "computers" include servers, laptops, desktops, netbooks, and notebooks, as well as handheld devices such as cellular phones, personal digital assistants, and portable game consoles.

When used in the claims, "computer executable instructions" should be understood to refer to data which can be used to specify physical or logical operations which can be performed by a computer.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Computer memory such as hard discs, read only memory, random access memory, solid state memory elements, optical discs and registers is an example of a "computer readable medium."

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft WORD on a computer "configures" that computer to function as a word processor, which it does by using the instructions for Microsoft WORD in combination with other inputs, such as an operating system, and various peripherals (e.g., a keyboard, monitor, etc).

When used in the claims, the term "data object" should be understood to refer to an identifiable and distinct entity expressed in a form (e.g., data stored in a computer readable medium) which can be manipulated by a computer.

When used in the claims, "database" should be understood be to a collection of data stored on a computer readable medium in a manner such that the data can be retrieved by a computer. The term "database" can also be used to refer to the computer readable medium itself (e.g., a physical object which stores the data).

When used in the claims, the verb "display" refers to the act of providing the thing "displayed" in a visually perceptible form. It should be understood that, in the context of this disclosure, "displaying" refers not only to actually physically presenting a thing on a screen, but also to causing that thing to be presented (e.g., by sending instructions from a local CPU, or by sending information over a network which causes a thing to be "displayed").

When used in the claims, an "element" of a "set" (defined infra) should be understood to refer to one of the things in the "set."

When used in the claims, the term "reciprocal date" should be understood to refer to a date for which scheduling an event will compensate for or balance another event between two entities.

When used in the claims, "remote" should be understood to refer to the relationship between entities which are physically distant from one another, such as between entities that communicate over a network.

When used in the claims, the term "set" should be understood to refer to a number, group, or combination of zero or more things of similar nature, design, or function.

When used in the claims, the term "storing" used in the context of a memory or computer readable medium should be understood to mean that the thing "stored" is reflected in one or more physical properties (e.g., magnetic moment, electric potential, optical reflectivity, etc) of the thing doing the "storing" for a period of time, however brief.

When used in the claims, the term "travel sport team" should be understood to refer to a team in a sport in which there are different fields and in which teams play at least a portion of their games by traveling to different fields. Examples of travel sport teams include baseball teams, soccer teams, hockey teams, football teams, lacrosse teams, as well as other teams for which there are home and away games, or for which a team travels to competitions.

The invention claimed is:

1. A system comprising:
   a) a server configured to:
      i) automatically determine a set of possible opponents for a travel sport team for an open time block by identifying possible opponents having reciprocal games that match or overlap the open time block;
      ii) for each opponent from the set of possible opponents, automatically determine a set of possible reciprocal dates on which both the opponent and the travel sport team are available for scheduling a reciprocal match;
      iii) based on receiving a message indicating a selected opponent for the travel sport team, generate an invitation for the selected opponent, the invitation comprising an indication of the open time block and the travel sport team; and
      iv) based on receiving a message indicating acceptance of the invitation comprising the indication of the open time block and the travel sport team, schedule a match between the travel sport team and the selected opponent during the open time block;
   b) a first user computer configured to:
      i) allow a user associated with the travel sport team to select the open time block;
      ii) send a message indicating the open time block to the server;
      iii) receive, from the server, the automatically determined set of possible opponents for the travel sport team for the open time block;
      iv) allow the user associated with the travel sport team to identify the selected opponent by selecting from the automatically determined set of possible opponents; and
      v) based on a command from the user associated with the travel sport team, send the message indicating the selected opponent from the set of possible opponents to the server.

2. The system of claim 1, wherein the system further comprises a second user computer configured to:
   a) receive, from the server, the invitation comprising the indication of the open time block and the travel sport team;
   allowing a user associated with the selected opponent to accept the invitation comprising the indication of the open time block and the travel sport team; and
   c) based on a command received from the user associated with the selected opponent, send the message from indicating acceptance of the invitation comprising the indication of the open time block and the travel sport team to the server.

3. The system of claim 1, wherein the first user computer is further configured to allow the user associated with the travel sport team to indicate that the match between the travel sport team and the selected opponent during the open time block should be scheduled without reciprocation.

4. The system of claim 3, wherein:
   a) the first user computer is further configured to allow the user associated with the travel sport team to select a reciprocal date from the set of possible reciprocal dates for the selected opponent;
   b) the server is further configured to:
      i) receive an indication of the selected reciprocal date from the first user computer;
      ii) based on receiving the indication of the selected reciprocal date from the first user computer, include, in the invitation comprising the indication of the open time block and the travel sport team, an indication of the selected reciprocal date; and
      iii) based on receiving the message indicating acceptance of the invitation comprising the indication of the open time block and the travel sport team after including the indication of the selected reciprocal date in the message, schedule a reciprocal match between the travel sport team and the selected opponent on the selected reciprocal date.

5. The system of claim 1, wherein the first user computer is configured to present a list of the automatically determined possible opponents, wherein the list of automatically determined possible opponents is ordered from a most constrained possible opponent a least constrained possible opponent.

* * * * *

UNITED STATES PATENT AND TRADEMARK OFFICE
CERTIFICATE OF CORRECTION

| | |
|---|---|
| PATENT NO. | : 8,738,413 B2 |
| APPLICATION NO. | : 13/507403 |
| DATED | : May 27, 2014 |
| INVENTOR(S) | : Marc Friedfertig et al. |

It is certified that error appears in the above-identified patent and that said Letters Patent is hereby corrected as shown below:

In the Claims:

Column 14, Claim 2, line 18, reads "allowing a user associated with..."; which should be deleted and replaced with "b) allowing a user associated with..."

Signed and Sealed this
Fifth Day of August, 2014

Michelle K. Lee
*Deputy Director of the United States Patent and Trademark Office*